US012346062B2

(12) United States Patent
Sugiyama et al.

(10) Patent No.: US 12,346,062 B2
(45) Date of Patent: Jul. 1, 2025

(54) TONER, TONER STORAGE UNIT, IMAGE FORMING APPARATUS AND METHOD OF FORMING IMAGE

(71) Applicants: Toshihiko Sugiyama, Shizuoka (JP); Junichi Watanabe, Shizuoka (JP); Yuka Mizoguchi, Shizuoka (JP); Hiroshi Yamashita, Shizuoka (JP); Kazuoki Fuwa, Shizuoka (JP); Tsuneyasu Nagatomo, Shizuoka (JP)

(72) Inventors: Toshihiko Sugiyama, Shizuoka (JP); Junichi Watanabe, Shizuoka (JP); Yuka Mizoguchi, Shizuoka (JP); Hiroshi Yamashita, Shizuoka (JP); Kazuoki Fuwa, Shizuoka (JP); Tsuneyasu Nagatomo, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 621 days.

(21) Appl. No.: 17/659,880

(22) Filed: Apr. 20, 2022

(65) Prior Publication Data

US 2022/0342332 A1 Oct. 27, 2022

(30) Foreign Application Priority Data

Apr. 23, 2021 (JP) ................................ 2021-073221

(51) Int. Cl.
*G03G 9/087* (2006.01)

(52) U.S. Cl.
CPC ..... *G03G 9/08793* (2013.01); *G03G 9/08797* (2013.01)

(58) Field of Classification Search
CPC ....................... G03G 9/08793; G03G 9/08797
See application file for complete search history.

(56) References Cited

U.S. PATENT DOCUMENTS

| | | | |
|---|---|---|---|
| 4,620,987 | A | 11/1986 | Yamashita et al. |
| 4,885,350 | A | 12/1989 | Yamashita et al. |
| 5,368,972 | A | 11/1994 | Yamashita et al. |
| 5,541,031 | A | 7/1996 | Yamashita et al. |
| 5,565,298 | A | 10/1996 | Suguro et al. |
| 5,576,393 | A | 11/1996 | Yamashita et al. |
| 5,648,842 | A | 7/1997 | Sekine et al. |
| 6,125,257 | A | 9/2000 | Sekine et al. |
| 6,140,000 | A | 10/2000 | Yamashita |
| 6,255,028 | B1 | 7/2001 | Hasegawa et al. |

(Continued)

FOREIGN PATENT DOCUMENTS

| | | | | |
|---|---|---|---|---|
| CN | 103339570 A | * 10/2013 | .......... | G03G 9/0821 |
| JP | 2004-170825 | 6/2004 | | |

(Continued)

OTHER PUBLICATIONS

JP2010072476A, Mukai et al. English Translation (Year: 2010).*

(Continued)

*Primary Examiner* — Ryan D Walsh
(74) *Attorney, Agent, or Firm* — Grüneberg and Myers PLLC

(57) ABSTRACT

A toner includes a binding resin; and a metal crosslinking agent that forms a metal crosslinking with the binding resin. A measurement curve of a storage elastic modulus G' in a dynamic viscoelasticity measurement has a maximum value in a range of 100° C. or more.

20 Claims, 5 Drawing Sheets

(56) References Cited

U.S. PATENT DOCUMENTS

| | | | |
|---|---|---|---|
| 6,329,115 | B1 | 12/2001 | Yamashita |
| 6,403,275 | B1 | 6/2002 | Kuramoto et al. |
| 6,416,914 | B1 | 7/2002 | Nakamura et al. |
| 6,432,589 | B1 | 8/2002 | Uchinokura et al. |
| 6,855,468 | B1 | 2/2005 | Yamamoto et al. |
| 2001/0051270 | A1 | 12/2001 | Yamashita et al. |
| 2002/0081510 | A1 | 6/2002 | Sugiyama et al. |
| 2003/0008225 | A1 | 1/2003 | Emura et al. |
| 2003/0022084 | A1 | 1/2003 | Sugiyama et al. |
| 2003/0027066 | A1 | 2/2003 | Yamashita et al. |
| 2003/0027074 | A1 | 2/2003 | Emoto et al. |
| 2003/0055159 | A1 | 3/2003 | Yamashita et al. |
| 2003/0077536 | A1 | 4/2003 | Yamashita et al. |
| 2003/0087169 | A1 | 5/2003 | Uchinokura et al. |
| 2003/0096185 | A1 | 5/2003 | Yamashita et al. |
| 2003/0113648 | A1 | 6/2003 | Tomita et al. |
| 2003/0134220 | A1 | 7/2003 | Emoto et al. |
| 2003/0138717 | A1 | 7/2003 | Yagi et al. |
| 2003/0152859 | A1 | 8/2003 | Emoto et al. |
| 2003/0219669 | A1 | 11/2003 | Yamashita et al. |
| 2004/0076899 | A1 | 4/2004 | Sugiyama et al. |
| 2004/0076900 | A1 | 4/2004 | Sugiyama et al. |
| 2004/0115551 | A1 | 6/2004 | Sugiyama et al. |
| 2004/0121256 | A1 | 6/2004 | Suzuki et al. |
| 2004/0131961 | A1 | 7/2004 | Watanabe et al. |
| 2004/0137344 | A1 | 7/2004 | Yamashita et al. |
| 2004/0185365 | A1 | 9/2004 | Saito et al. |
| 2004/0259013 | A1 | 12/2004 | Ohtani et al. |
| 2005/0003288 | A1 | 1/2005 | Sugiyama et al. |
| 2005/0079433 | A1 | 4/2005 | Watanabe et al. |
| 2006/0063081 | A1 | 3/2006 | Nagatomo et al. |
| 2006/0127788 | A1 | 6/2006 | Yamashita et al. |
| 2006/0177756 | A1 | 8/2006 | Sugimoto et al. |
| 2006/0292482 | A1 | 12/2006 | Yamashita et al. |
| 2007/0015077 | A1 | 1/2007 | Yamashita et al. |
| 2007/0141500 | A1 | 6/2007 | Sugimoto et al. |
| 2007/0184370 | A1 | 8/2007 | Yamashita et al. |
| 2007/0218383 | A1 | 9/2007 | Seshita et al. |
| 2007/0218385 | A1 | 9/2007 | Kojima et al. |
| 2007/0218387 | A1 | 9/2007 | Ishii et al. |
| 2008/0032226 | A1 | 2/2008 | Sugiyama et al. |
| 2008/0069598 | A1 | 3/2008 | Murakami et al. |
| 2008/0069608 | A1 | 3/2008 | Katoh et al. |
| 2008/0070149 | A1 | 3/2008 | Kato et al. |
| 2008/0159777 | A1 | 7/2008 | Fuwa et al. |
| 2008/0199234 | A1 | 8/2008 | Hagi et al. |
| 2008/0226356 | A1 | 9/2008 | Yasunaga et al. |
| 2008/0227015 | A1 | 9/2008 | Nagatomo et al. |
| 2008/0233506 | A1 | 9/2008 | Hagi et al. |
| 2008/0279591 | A1 | 11/2008 | Yasunaga et al. |
| 2008/0280218 | A1 | 11/2008 | Sabu et al. |
| 2008/0280219 | A1 | 11/2008 | Nakayama et al. |
| 2008/0318144 | A1 | 12/2008 | Watanabe et al. |
| 2008/0318148 | A1 | 12/2008 | Sugimoto et al. |
| 2009/0142094 | A1 | 6/2009 | Sawada et al. |
| 2009/0142686 | A1 | 6/2009 | Kojima et al. |
| 2009/0162772 | A1 | 6/2009 | Fuwa et al. |
| 2009/0162780 | A1 | 6/2009 | Yamashita et al. |
| 2009/0169270 | A1 | 7/2009 | Fuwa et al. |
| 2010/0075245 | A1 | 3/2010 | Watanabe et al. |
| 2010/0119255 | A1 | 5/2010 | Seshita et al. |
| 2011/0076607 | A1 | 3/2011 | Sugimoto et al. |
| 2011/0076610 | A1 | 3/2011 | Ogawa et al. |
| 2011/0129773 | A1 | 6/2011 | Shu et al. |
| 2011/0136052 | A1 | 6/2011 | Watanabe et al. |
| 2011/0151372 | A1 | 6/2011 | Watanabe et al. |
| 2011/0223532 | A1 | 9/2011 | Sugimoto et al. |
| 2011/0250533 | A1 | 10/2011 | Kadota et al. |
| 2011/0262853 | A1 | 10/2011 | Watanabe et al. |
| 2011/0281209 | A1 | 11/2011 | Sugiura et al. |
| 2011/0294058 | A1 | 12/2011 | Shiba et al. |
| 2011/0294064 | A1 | 12/2011 | Miyaake et al. |
| 2012/0021347 | A1 | 1/2012 | Shimota et al. |
| 2012/0189951 | A1 | 7/2012 | Sugimoto et al. |
| 2012/0219321 | A1 | 8/2012 | Fukao et al. |
| 2012/0219896 | A1 | 8/2012 | Asahina et al. |
| 2012/0237267 | A1 | 9/2012 | Fukao et al. |
| 2012/0237870 | A1 | 9/2012 | Watanabe et al. |
| 2012/0251938 | A1 | 10/2012 | Yamamoto et al. |
| 2012/0264048 | A1 | 10/2012 | Ishikawa et al. |
| 2012/0328976 | A1 | 12/2012 | Seki et al. |
| 2013/0059249 | A1 | 3/2013 | Watanabe et al. |
| 2013/0157185 | A1 | 6/2013 | Sakashita et al. |
| 2013/0164669 | A1 | 6/2013 | Yamashita et al. |
| 2013/0244155 | A1 | 9/2013 | Satoh et al. |
| 2013/0244158 | A1 | 9/2013 | Awamura et al. |
| 2013/0244169 | A1 | 9/2013 | Miyaake et al. |
| 2013/0309603 | A1 | 11/2013 | Takahashi et al. |
| 2013/0337376 | A1 | 12/2013 | Watanabe et al. |
| 2014/0023965 | A1 | 1/2014 | Chiba et al. |
| 2014/0050504 | A1 | 2/2014 | Fukao et al. |
| 2014/0072349 | A1 | 3/2014 | Sakashita et al. |
| 2014/0080046 | A1 | 3/2014 | Asahina et al. |
| 2014/0147779 | A1 | 5/2014 | Fuwa et al. |
| 2014/0147780 | A1 | 5/2014 | Nozaki et al. |
| 2014/0147784 | A1 | 5/2014 | Kadota et al. |
| 2014/0272689 | A1 | 9/2014 | Yamashita et al. |
| 2014/0348546 | A1 | 11/2014 | Kojima et al. |
| 2014/0356774 | A1 | 12/2014 | Miki et al. |
| 2015/0024312 | A1 | 1/2015 | Shiba et al. |
| 2015/0072277 | A1 | 3/2015 | Sugiura et al. |
| 2015/0104739 | A1 | 4/2015 | Nagatomo et al. |
| 2015/0153671 | A1 | 6/2015 | Yamauchi et al. |
| 2015/0268574 | A1 | 9/2015 | Miyaake et al. |
| 2016/0004179 | A1 | 1/2016 | Sugimoto et al. |
| 2016/0033924 | A1 | 2/2016 | Fukao et al. |
| 2016/0070191 | A1 | 3/2016 | Kumai et al. |
| 2016/0091812 | A1 | 3/2016 | Makabe et al. |
| 2017/0017175 | A1 | 1/2017 | Yamada et al. |
| 2017/0248896 | A1 | 8/2017 | Nakatake et al. |
| 2019/0235405 | A1 | 8/2019 | Masuda et al. |
| 2020/0089140 | A1 | 3/2020 | Masuda et al. |
| 2020/0124999 | A1 | 4/2020 | Tanka et al. |
| 2021/0116830 | A1 | 4/2021 | Takei et al. |
| 2021/0124281 | A1 | 4/2021 | Sugiyama et al. |
| 2022/0057726 | A1 | 2/2022 | Mizoguchi et al. |

FOREIGN PATENT DOCUMENTS

| | | | | |
|---|---|---|---|---|
| JP | 2004163570 | A | * | 6/2004 |
| JP | 2004-191927 | | | 7/2004 |
| JP | 2004-198692 | | | 7/2004 |
| JP | 2005-049484 | | | 2/2005 |
| JP | 2009-288805 | | | 12/2009 |
| JP | 2010-072476 | | | 4/2010 |
| JP | 2012-177914 | | | 9/2012 |
| JP | 2014-002264 | | | 1/2014 |
| JP | 2020-064266 | | | 4/2020 |
| JP | 2021076822 | A | * | 5/2021 |

OTHER PUBLICATIONS

CN-103339570-A, English Translation (Year: 2013).*

JP-2004163570-A, English Translation (Year: 2004).*

JP-2021076822-A, English Translation (Year: 2021).*

Japanese Office Action received for Japanese Patent Application No. 2021-073221, mailed on Sep. 10, 2024, 5 pages with English translation.

U.S. Appl. No. 06/752,591, filed Jul. 8, 1985.

U.S. Appl. No. 07/362,488, filed Jun. 7, 1989.

U.S. Appl. No. 07/596,474, filed Oct. 12, 1990.

U.S. Appl. No. 07/948,453, filed Sep. 21, 1992.

U.S. Appl. No. 08/165,101, filed Dec. 10, 1993.

U.S. Appl. No. 17/557,284, filed Dec. 21, 2021.

* cited by examiner

TONER, TONER STORAGE UNIT, IMAGE FORMING APPARATUS AND METHOD OF FORMING IMAGE

CROSS-REFERENCE TO RELATED APPLICATION

The present application claims priority under 35 U.S.C. § 119 to Japanese Patent Application No. 2021-073221, filed Apr. 23, 2021. The contents of which are incorporated herein by reference in their entirety.

BACKGROUND OF THE INVENTION

1. Field of the Invention

The disclosures herein generally relate to a toner, a toner storage unit, an image forming apparatus, and a method of forming an image.

2. Description of the Related Art

In recent years, there has been a need for a toner to reduce an environmental load. For this purpose, for example, a reduction of energy and chemicals used in a manufacturing process of a toner and a reduction of power consumption by improving low-temperature fixing property of a toner have been studied.

A pulverization method has been used as a manufacturing method of a toner. However, energy used in the manufacturing process of toner is large and smaller diameter of toner particles has been required, so that chemical toner by as suspended polymerization or the like has become mainstream. In addition, as a method for improving the low-temperature toner fixing property, a method of introducing a crystalline resin into a binding resin has been known.

One method of increasing the offset resistance of a toner is a method of adjusting a viscoelasticity of the toner. Specifically, a method of controlling a specific viscoelasticity by introducing a highly crystalline resin into a binding resin of a toner has been proposed (See, for example, Japanese unexamined patent application publication No. 2005-49484).

In addition, a method of providing a toner with excellent hot offset performance and mechanical durability by adjusting a molar ratio of a polyester resin component to a group of atoms derived from a polyhydric alcohol contained in a binding resin of the toner has been proposed (see, for example, Japanese unexamined patent application publication No. 2009-288805).

SUMMARY OF THE INVENTION

Problem to be Solved by the Invention

However, offset resistance and color reproducibility of toners obtained by conventional method are found to be insufficient.

An object of the present invention is to provide a toner having excellent offset resistance and color reproducibility.

Means for Solving the Problem

In order to solve the above-described problem, according to an aspect of the present invention, a toner includes a binding resin and a metal crosslinking agent that forms metal crosslinking with the binding resin. A measurement curve of a storage elastic modulus G' in a dynamic viscoelasticity measurement has a maximum value in a range of 100° C. or more.

Effects of the Invention

According to an aspect of the present invention, toner having excellent offset resistance and color reproducibility can be provided.

BRIEF DESCRIPTION OF DRAWINGS

Other objects and further features of the present invention will be apparent from the following detailed description when read in conjunction with the accompanying drawings, in which.

MODE FOR CARRYING OUT THE INVENTION

Figure 1:
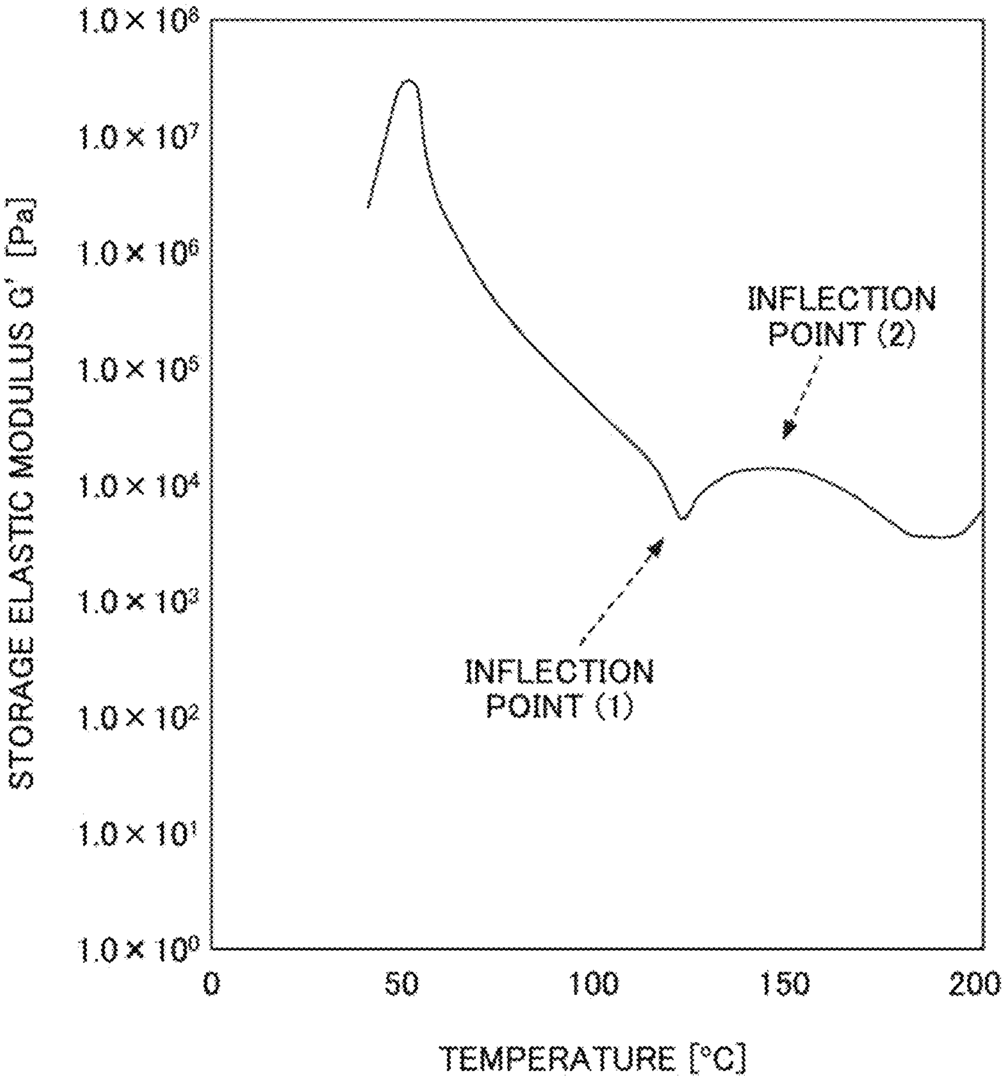
FIG. 1 is a graph illustrating an example of a measured curve of the storage elastic modulus.

Hereinafter, embodiments of the present invention will be described.

<Toner>

A toner according to the present embodiment contains a binding resin and a metal crosslinking agent that forms metal crosslinking with the binding resin, and a measurement curve of a storage elastic modulus G' in a dynamic viscoelasticity measurement has a maximum value in a range of 100° C. or more. Hereinafter, as an example of the toner according to the present invention, a toner containing matrix particles and an external additive will be described.

[Matrix Particles]

Matrix particles represent particles that constitute a matrix (hereinafter, referred to as a toner matrix or toner matrix particles) that serve as a core of the toner. The toner matrix contains a binding resin and an aggregated salt.

[Binding Resin]

The binding resin is an example of the binding resin contained in the toner according to the present embodiment. The binding resin is not particularly limited, but preferably contains a crystalline resin and an amorphous resin. The binding resin preferably contains, as the crystalline resin, a crystalline polyester resin. In addition, the binding resin preferably contains, as the amorphous resin, an amorphous polyester resin.

[Crystalline Polyester Resin]

The melting point of the crystalline polyester resin preferably falls within a range from 50° C. to 100° C., more preferably falls within a range from 55° C. to 90° C., and even more preferably falls within a range from 55° C. to 85° C.

Since the melting point of the crystalline polyester resin is 50° C. or more, blocking does not occur in a stored toner, and the storage property of the toner and the storage property of fixed images after fixing are good. In addition, since the melting point of the crystalline polyester resin is not more than 100° C., sufficient low-temperature fixing property is obtained. The melting point of the crystalline polyester resin is determined as a peak temperature of an endothermic peak obtained by differential scanning calorimetry (DSC).

In the present embodiment, the crystalline polyester resin includes not only a polymer of 100% polyester structure, but also a copolymer of the monomer constituting the polyester and other monomers. However, a percentage of the other monomers in the copolymer is less than or equal to 50 wt %.

The crystalline polyester resin used in the toner according to the present embodiment is synthesized from, for example, a polyvalent carboxylic acid and a polyhydric alcohol. The crystalline polyester resin may be commercially available or synthesized.

Suitable polyvalent carboxylic acids may include, for example, an aliphatic dicarboxylic acid, such as oxalic acid, maleic acid, fumaric acid, succinic acid, glutaric acid, adipic acid, suberic acid, azelaic acid, sebacic acid, 1,9-nonandicarboxylic acid, 1,10-decanedicarboxylic acid, 1,12-dodecanedicarboxylic acid, 1,14-tetradecandicarboxylic acid, 1,18-octadecanedicarboxylic acid, or mesaconic acid; an aromatic dicarboxylic acid, such as phthalic acid, isophthalic acid, terephthalic acid, naphthalene-2,6-dicarboxylic acid, malonic acid, trimellitic acid, or naphthalene dicarboxylic acid; an alicyclic carboxylic acid such as cyclohexanedicarboxylic acid; anhydrides thereof; or lower alkyl esters thereof.

Suitable trivalent or higher carboxylic acids may include, for example, pyromellitic acid, 1,2,4-benzenetricarboxylic acid, 1,2,5-benzenetricarboxylic acid, 1,2,4-naphthalenetricarboxylic acid, and the like; anhydrides thereof, lower alkyl esters thereof, and the like. The above-described carboxylic acids may be used singly, or a combination of two or more carboxylic acids may be used.

The polyvalent carboxylic acid may also include a dicarboxylic acid having a sulfonic acid group as another carboxylic acid. In addition, the polyvalent carboxylic acid may include a dicarboxylic acid with a double bond.

As the polyhydric alcohol, aliphatic diols are preferable, linear aliphatic diols having 7 to 20 carbon atoms in the main chain portion are more preferable, and linear aliphatic diols having 7 to 14 carbon atoms in the main chain portion are further preferable.

Branched aliphatic diols may reduce the crystallinity of a polyester resin and lower the melting point. In addition, when the number of carbon atoms in the main chain portion is less than 7, the melting temperature becomes higher in the case of polycondensation with an aromatic dicarboxylic acid, and the low temperature fixing becomes difficult. On the other hand, if the number of carbon atoms in the main chain portion exceeds 20, preparation of the material becomes practically difficult.

Among the polyhydric alcohols, the content of the aliphatic diol is preferably 80 mole or more, and more preferably 90 mole- or more. When the content of the polyester resin is less than 80 mole percent, the crystallinity of the polyester resin is degraded and the melting temperature becomes lower. Then, the toner blocking resistance, image storage property, and low temperature fixing property may become deteriorated.

Aliphatic diols may include, for example, an aliphatic diol, such as ethylene glycol, diethylene glycol, triethylene glycol, 1,2-propanediol, 1,3-propanediol, 1,4-butanediol, 1,5-pentanediol, neopentyl glycol, 1,2-hexanediol, 1,6-hexanediol, 1,7-heptanediol, 1,8-octanediol, 1,9-nonandiol, 1,10-decanediol, 1,11-undecanediol, 1,12-dodecanediol, 1,13-tridecanediol, 1,14-tetradecanediol, 1,18-octadecanediol, or 1,14-eicosandiol; an alicyclic diol, such as cyclohexanediol, cyclohexanedimethanol, or hydrogenated bisphenol A; or an aromatic diol, such as ethylene oxide adduct of bisphenol A, or propylene oxide adducts of bisphenol A. Among them, 1,8-octanediol, 1,9-nonanediol, and 1,10-decanediol are preferred for ease of availability.

Trihydric or higher hydric alcohols may include, for example, glycerin, trimethylolethane, trimethylolpropane, pentaerythritol, and the like. The above-described alcohols may be used singly, or a combination of two or more alcohols may be used.

The above-described polyvalent carboxylic acids or polyhydric alcohols may be added at the final stage of the synthesis, for the purpose of adjusting an acid value or a hydroxyl value, or the like, as necessary.

The crystalline polyester resin can be manufactured at a polymerization temperature of from 180° C. to 230° C. If necessary, the pressure in the reaction system is reduced and the reaction is carried out while removing water and alcohol generated during condensation. If the monomer does not dissolve or is not compatible with a solvent at the reaction temperature, a high-boiling solvent may be added as a dissolution aid to dissolve the monomer.

In the polycondensation reaction, the reaction is carried out while distilling a dissolution aid solvent. If monomers having poor compatibility are present in a copolymerization reaction, the monomers with poor compatibility may be condensed with the acid or alcohol to be polycondensed in advance, and the polycondensation reaction may be carried out with the main component.

Catalysts used for manufacturing a polyester resin may include, for example, compounds of alkali metal, such as sodium, or lithium; compounds of alkaline earth metal, such as magnesium, or calcium; compounds of metal, such as zinc, manganese, antimony, titanium, tin, zirconium, or germanium; phosphorous acid compounds; phosphate compounds; amine compounds, and the like.

Specifically, catalysts may include, for example, compounds, such as sodium acetate, sodium carbonate, lithium acetate, lithium carbonate, calcium acetate, calcium stearate, magnesium acetate, zinc acetate, zinc stearate, zinc naphthenate, zinc chloride, manganese acetate, manganese naphthenate, titanium tetraethoxide, titanium tetrapropoxide, titanium tetraisopropoxide, titanium tetrabutoxide, antimony trioxide, triphenylantimony, tributylantimony, tin formate, tin oxalate, tetraphenyltin, dibutyltin dichloride, dibutyltin oxide, diphenyltin oxide, zirconium tetrabutoxide, zirconium naphthenate, zirconyl carbonate, zirconyl acetate, zirconyl stearate, zirconyl octylate, germanium oxide, triphenylphosphite, tris(2,4-di-t-butylphenyl) phosphite, ethyltriphenylphosphonium bromide, triethylamine, or triphenylamine.

The above-described crystalline polyester resins may be used singly, or a combination of two or more resins may be used.

The content of the crystalline polyester resin in the toner is normally greater than or equal to 3 wt % and less than or equal to 20 wt %, and preferably greater than or equal to 5 wt % and less than or equal to 15 wt %. According to the content of the crystalline polyester resin in the toner of 3 wt or more, the low temperature fixing property of the toner can be improved, and according to the content of the crystalline polyester resin of 20 wt % or less, the heat resistant preservability property of the toner can be improved, and at the same time, it is possible to suppress an occurrence of fog on an image.

[Amorphous Polyester Resin]

Amorphous polyester resins include, for example, modified polyester resins and unmodified polyester resins. The amorphous polyester resin according to the present embodiment preferably contains both polyester resins.

[Modified Polyester Resin]

Modified polyester resins may include, for example, polyesters having isocyanate groups. Polyester prepolymer (A) having an isocyanate group may include, for example, a product of a reaction for polyester, which is a polycondensation product of a polyol (1) and a polyvalent carboxylic acid (2), and has an active hydrogen group, with a polyisocyanate (3).

The active hydrogen group, which the above-described polyester has, may include, for example, a hydroxyl group (an alcoholic hydroxyl group and a phenolic hydroxyl group), an amino group, a carboxyl group, or a mercapto group. Among the above-described groups, the alcoholic hydroxyl group is preferable.

Polyols (1) may include, for example, diols (1-1) and trivalent or higher polyols (1-2). Among them, diol (1-1) alone or a mixture of diol (1-1) and a small amount of polyol (1-2) are preferable.

Diols (1-1) may include, for example, alkylene glycols (ethylene glycol, 1,2-propylene glycol, 1,3-propylene glycol, 1,4-butanediol, 1,6-hexanediol, and the like); alkylene ether glycols (diethylene glycol, triethylene glycol, dipropylene glycol, polyethylene glycol, polypropylene glycol, polytetramethylene ether glycol, and the like); alicyclic diols (1,4-cyclohexanedimethanol, hydrogenated bisphenol A, and the like); bisphenols (bisphenol A, bisphenol F, bisphenol S, and the like); alkylene oxides of the alicyclic diols (ethylene oxide, propylene oxide, butylene oxide, and the like) adducts; and alkylene oxide of the bisphenols (ethylene oxide, propylene oxide, propylene oxide, butylene oxide, and the like) adducts.

Among them, alkylene glycols having 2 to 12 carbon atoms and alkylene oxide adducts of bisphenols are preferable, and alkylene oxide adducts of bisphenols and a combination of alkylene oxide adducts of bisphenols and alkylene glycols having 2 to 12 carbon atoms are more preferable.

Trivalent polyols (1-2) may include, for example, polyaliphatic alcohols with a valence of from three to eight, or higher than eight (glycerin, trimethylol ethane, trimethylol propane, pentaerythritol, sorbitol, and the like); phenols with a valence of three or higher (trisphenol PA, phenol novolac, cresol novolac, and the like); and alkylene oxide adducts of the above-described polyphenols with a valence of three or higher.

Polyvalent carboxylic acids (2) may include, for example, dicarboxylic acid (2-1) and a polyvalent carboxylic acid (2-2) with a valence of three or higher. Dicarboxylic acid (2-1), and a combination of dicarboxylic acid (2-1) and a small amount of polyvalent carboxylic acid (2-2) are preferable.

Dicarboxylic acids (2-1) may include, for example, alkylene dicarboxylic acids (succinic acid, adipic acid, sebacic acid, and the like); alkenylene dicarboxylic acids (maleic acid, fumaric acid, and the like); and aromatic dicarboxylic acids (phthalic acid, isophthalic acid, terephthalic acid, naphthalene dicarboxylic acid, and the like). Among them, alkenylene dicarboxylic acids having 4 to 20 carbon atoms and aromatic dicarboxylic acids having 8 to 20 carbon atoms are preferable.

Polyvalent carboxylic acids (2-2) with a valence of 3 or higher may include, for example, aromatic polyvalent carboxylic acids having 9 to 20 carbon atoms (trimellitic acid, pyromellitic acid, and the like). As the polyvalent carboxylic acid (2), the above-described anhydride or lower alkyl ester (methyl ester, ethyl ester, isopropyl ester, or the like) may be used.

A ratio of the polyol (1) to polyvalent carboxylic acid (2) is normally from 2/1 to 1/1, preferably from 1.5/1 to 1/1, and more preferably from 1.3/1 to 1.02/1, as an equivalence ratio [OH]/[COOH] of a hydroxyl group (OH) to a carboxyl group (COOH).

Polyisocyanates (3) may include, for example, aliphatic polyisocyanates (tetramethylene diisocyanate, hexamethylene diisocyanate, 2,6-diisocyanatomethyl caproate, and the like); alicyclic polyisocyanates (isophorone diisocyanate, cyclohexylmethane diisocyanate, and the like); aromatic diisocyanates (trilene diisocyanate, diphenylmethane diisocyanate, and the like); aromatic aliphatic diisocyanates (α, α, α', α', α'-tetramethylxylylene diisocyanate, and the like); isocyanurates; and compounds obtained by blocking the above-described polyisocyanates with phenol derivatives, oximes, caprolactam, and the like.

The above-described amorphous polyester resins may be used singly, or a combination of two or more resins may be used.

A ratio of the polyisocyanate (3) is usually 5/1 to 1/1, preferably 4/1 to 1.2/1, and more preferably 2.5/1 to 1.5/1 as an equivalence ratio [NCO]/[OH], of an isocyanate group [NCO] and a hydroxyl group [OH] of polyester having the hydroxyl group. If [NCO]/[OH] exceeds 5, the low temperature fixing property deteriorates. When the molar ratio of [NCO] is less than 1, a urea content in the modified polyester decreases and the hot offset resistance deteriorates.

A content of polyisocyanate (3) in polyester prepolymer (A) having an isocyanate group at its terminal is normally from 0.5 wt % to 40 wt %, preferably from 1 wt % to 30 wt %, and more preferably from 2 wt % to 20 wt %. When the content is less than 0.5 wt %, the hot offset resistance deteriorates, and at the same time, it becomes difficult to achieve both the heat resistant preservability property and the low-temperature fixing property. Further, if the content exceeds 40 wt %, the low-temperature fixing property deteriorates.

A number of isocyanate groups contained per molecule in polyester prepolymer (A) having isocyanate group is normally one or more, preferably, from 1.5 to 3 on average, and more preferably from 1.8 to 2.5 on average. When the number is less than 1 per molecule, a molecular weight of the modified polyester after crosslinking and/or extension is low, and the hot offset resistance deteriorates.

[Unmodified Polyester Resin]

In the present embodiment, as well as the above-described modified polyester prepolymer (A) used singly, the toner preferably contains unmodified polyester (C) as a toner binder component with polyester prepolymer (A). When polyester (C) is used in combination, the low temperature fixing property, glossiness and gloss uniformity when used in a full color device are improved.

Polyesters (C) may include, for example, a polycondensation product of polyol (1) and polyvalent carboxylic acid (2) similar to the polyester component of the above-described polyester prepolymer (A), and preferably a product of a further reaction of polyester having an active hydrogen group, which is the polycondensation product, with polyisocyanate (3).

The polyester (C) may be modified by chemical bonds other than urea bonds, for example, by urethane bonds, as well as unmodified polyester.

The polyester prepolymer (A) and the polyester (C) are preferably at least partially compatible with each other in terms of the low temperature fixing property and the hot offset resistance. Accordingly, the polyester (C) preferably has a similar composition to that of the polyester component of the polyester prepolymer (A).

A weight ratio of the polyester prepolymer (A) to the polyester (C) when containing the polyester prepolymer (A) is usually from 5/95 to 75/25, preferably from 10/90 to 25/75, more preferably from 12/88 to 25/75, and even more preferably from 12/88 to 22/78. When the weight ratio of the polyester prepolymer (A) is less than 5%, the hot offset resistance deteriorates and it becomes difficult to achieve both the heat resistant preservability property and the low-temperature fixing property.

The peak molecular weight of the polyester (C) is normally from 1,000 to 30,000, preferably from 1,500 to 10,000, and more preferably from 2,000 to 8,000. When the peak molecular weight is 1,000 or more, the deterioration of the heat resistant preservability property is suppressed. When the peak molecular weight is 10,000 or less, the deterioration of the low-temperature fixing property is suppressed.

The hydroxyl group value of the polyester (C) is preferably 5 or more, more preferably 10 or more and 120 or less, and even more preferably 20 or more and 80 or less. When the hydroxyl value is 5 or more, it is advantageous from the viewpoint of achieving both the heat resistant preservability property and the low-temperature fixing property.

The acid value of the polyester (C) is normally from 0.5 to 40, and preferably from 5 to 35. Toners tend to become negatively charged when the toners have the acid value. In addition, if the acid value and the hydroxyl value are within the above-described ranges, respectively, toners are less likely to be affected by an environment of high temperature and high humidity and by an environment of low temperature and low humidity, and the deterioration of an image is suppressed.

The content of amorphous polyester resin in the toner is typically from 50 wt % to 90 wt %, and preferably from 60 wt % to 80 wt %. When the content of the amorphous polyester A in the toner is 50 wt % or more, an occurrence of fogging and artifacts in an image can be suppressed. Because of the content of 90 wt or less, the low temperature fixing property of the toner can be improved.

[Aggregated Salt]

An aggregated salt forms a metal crosslinking with a binding resin. The aggregated salt is an example of a metal crosslinking agent included in the toner according to the present embodiment.

A viscoelasticity of the toner according to the present embodiment can be controlled by a type of the aggregated salt to be added in an aggregation process to be described later and an acid value of a polyester resin constituting the toner. The storage elastic modulus of the toner, which will be described below, is proportional to a ratio of presence of a salt of metal, such as magnesium, contained in the aggregated salt to carboxyl groups contained in the polyester resin in the toner. If the ratio of the metal salt to the carboxyl group is high, the viscoelasticity of the toner is high.

The reason for the above-described property is thought to be an increase in a crosslinking density due to chelation of the carboxyl group with a magnesium ion, which is a polyvalent metal ion, to form a metal crosslinking. Further, since a viscoelasticity of a core resin can be uniformly controlled in comparison with a method of controlling the viscoelasticity by coating the core resin with a Si shell by such as suspension polymerization, it is possible to develop more stable viscoelasticity of the toner.

The aggregated salt preferably contains a metal salt having a valence of one or higher in order to ensure sufficient crosslinking density. In addition, the metal salt having a valence of one or higher contained in the aggregated salt is preferably a divalent metal salt, and more preferably a trivalent metal salt. Known aggregation agent can be applied to the present embodiment, which includes metal salts of monovalent metals, such as sodium and potassium, metal salts of divalent metals, such as calcium and magnesium, and metal salts of trivalent metals, such as iron and aluminum.

The above-described aggregated salts may be used singly, or a combination of two or more aggregated salts may be used.

[Method for Evaluating Metal Salts Existed in Toner]

In the present embodiment, quantitative analysis of metal salts contained in a toner is preferably performed by the following method.

That is, toner is dissolved in each of xylene, ethanol and chloroform by 1 ppm, so that sample solutions are prepared. Each sample solution can be analyzed (N=5) by an ICP emission spectrum analyzer (SPS-3100 by Seiko Instruments Inc.).

The measurement conditions are shown below:

High frequency output: 1.6 kW;

Plasma gas flow rate: 18 L/min;

Auxiliary gas flow rate: 1.5 L/min;

Carrier gas flow rate: 0.1 MPa;

Integration number of times: 3 times;

Integration time: 2 seconds; and

Photometric height: 12 mm.

In the toner according to the present embodiment, the aggregated salt (metal crosslinking agent), contained in the toner matrix, contains a metal salt having a valence of one or more, as described above, so that the crosslinking density of the binding resin is increased in the toner matrix, and the viscoelasticity of the binding resin is improved. Thus, the viscoelasticity of the toner is stabilized and the offset resistance is improved.

The toner matrix further contains other ingredients as necessary. The other ingredients may include, for example, coloring agents, release agents, charge control agents, and the like.

[Coloring Agent]

The coloring agent is not particularly limited and may be appropriately selected depending on the purpose. Suitable coloring agents may include, for example, carbon black, nigrosine dye, iron black, naphthol yellow S, hansa yellow (10G, 5G, G), cadmium yellow, yellow iron oxide, loess, chrome yellow, titan yellow, polyazo yellow oil yellow, hansa yellow (GR, A, RN, R), pigment yellow L, benzidine yellow (G, GR), permanent yellow (NCG), vulcan fast yellow (5G, R), tartrazine lake, quinoline yellow lake, anthracite yellow BGL, isoindolinone yellow, colcothar, red lead, vermilion, cadmium red, cadmium mercury red, antimony vermilion, permanent red 4R, paranitraniline red, fire red, para chloro ortho nitro aniline red, lithol fast scarlet G, brilliant fast scarlet, brilliant carmine BS, permanent red (F2R, F4R, FRL, FRLL, F4RH), fast scarlet VD, vulcan fast rubine B, brilliant scarlet G, lithol rubine GX, permanent red F5R, brilliant carmine 6B, pigment scarlet 3B, bordeaux 5B, toluidine maroon, permanent bordeaux F2K, helio bordeaux BL, bordeaux 10B, bon maroon light, bon maroon medium, eosine lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkaline blue lake, peacock blue lake, victoria blue lake, metal-free phthalocyanine blue, phthalocyanine blue, fast sky blue, indanthrene blue (RS, BC), indigo, ultramarine blue, prussian blue, anthraquinone blue, fast violet B, methyl-violet lake, cobalt violet, manganese violet, dioxane violet, anthraquinone violet, chrome green, zinc green, chrome oxide, viridian, emerald green, pigment green B, naphthol green B, green gold, acid green lake, malachite green lake, phthalocyanine green, anthraquinone green, titanium oxide, zinc white, lithopone, and the like.

The above-described coloring agents may be used singly, or a combination of two or more coloring agents may be used.

The content of the coloring agent in the toner is not particularly limited, and can be appropriately selected according to a purpose. The content preferably is within a range from 1 wt- to 15 wt %, and more preferably is within a range from 3 wt % to 10 wt % with respect to 100 wt % of the toner.

The coloring agent may be used as a master batch combined with a resin.

Resins to be combined with the coloring agent to manufacture the master batch may include, for example, in addition to the above-described amorphous polyester resin, styrene or substituted styrene polymers, such as polystyrene, poly-p-chlorostyrene, and polyvinyl toluene; styrene based copolymers, such as styrene-p-chrolostyrene copolymers, styrene-propylene copolymers, styrene-vinyl toluene copolymers, styrene-vinyl naphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-α-chloro methyl methacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, and styrene-maleic ester copolymers; polymethyl methacrylates, polybutylmethacrylates, polyvinyl chlorides, polyvinyl acetates, polyethylenes, polypropylenes, polyester, epoxy resins, epoxy polyol resins, polyurethanes, polyamides, polyvinyl butyrals, polyacrylic acid resins, rosins, modified rosins, terpene resins, aliphatic hydrocarbon resins, alicyclic hydrocarbon resins, aromatic based petroleum resins, chlorinated paraffins, paraffin waxes, and the like. The above-described resins may be used singly, or a combination of two or more resins may be used.

The master batch can be obtained by mixing and kneading the resin selected for master batch and the coloring agent while applying high shearing force. During the mixing and kneading, an organic solvent can be used to enhance the interaction between the coloring agent and the resin.

Moreover, the so-called flushing method is also used in that an aqueous paste including the coloring agent and water is mixed and kneaded with the resin and the organic solvent, the coloring agent is thereby transferred to the resin, and the water and the organic solvent are subsequently removed. The flushing method is preferably used, because a wet cake of the coloring agent can be used as it is, thereby rendering a drying process unnecessary. In the mixing and kneading process, for example, a high shear and dispersion apparatus, such as a three-roll mill, is preferably used.

(Release Agent)

The release agent is not particularly limited, and can be appropriately selected according to a purpose. The release agents include, for example, waxes or the like. The waxes include, for example, natural waxes including botanical waxes such as carnauba wax, cotton wax, japan wax, and rice wax; animal waxes such as beeswax, and lanolin; mineral-based waxes such as ozocerite, and selsyn; and petroleum waxes such as paraffin, microcrystalline, and petrolatum; and the like.

Moreover, in addition to the above-described natural waxes, the release agents may include synthetic hydrocarbon waxes such as fischer-tropsch waxes, polyethylene, and polypropylene; synthetic waxes such as esters, ketones, and ethers; and the like.

Furthermore, in addition to the above-described waxes, the release agents may include aliphatic acid amide-based compound such as 12-hydroxystearic acid amide, amide stearate, phthalimide anhydride, or chlorinated hydrocarbons; homopolymers or copolymers of polyacrylate such as poly-n-stearyl methacrylate, or poly-n-lauryl methacrylate, which is a crystalline high polymer resin with a low molecular weight (e.g. a copolymer of n-stearyl acrylate-ethyl methacrylate); a crystalline polymer having a long alkyl group in the side chain; and the like may be used.

The above-described release agents may be used singly, or a combination of two or more release agents may be used.

The melting point of the release agent is not particularly limited, and is preferably within a range from 60° C. to 80° C. When the melting point is 60° C. or higher, it is possible to suppress melting of the release agent at a low temperature, and suppress degradation of the heat resistant preservability. When the melting point is 80° C. or lower, in the case where the resin melts and is within the fixing temperature range, it is possible to suppress an occurrence of a fixing offset due to insufficient melting of the release agent, and thus it is possible to suppress a deficiency of an image.

(Charge Control Agent)

A charge control agent is not particularly limited, and can be appropriately selected according to a purpose.

The charge control agents include, for example, nigrosine dye, triphenylmethane dye, chromium-including metal complex dye, chelate molybdate dye, rhodamine-based dye, alkoxyamine, quaternary ammonium salt (including fluorine-modified quaternary ammonium salt), alkylamide, simple substance phosphorus or a compound thereof, a simple substance tungsten or a compound thereof, a fluorine-based activator, a metallic salt of salicylic acid, a metallic salt of a salicylic acid derivative, and the like.

Specific examples of charge control agents include BONTRON 03, which is nigrosine dye, BONTRON P-51, which is quaternary ammonium salt, BONTRON S-34, which is metal including azo dye, E-82, which is oxynaphtoic acid-based metal complex, E-84, which is salicylic acid metal complex, and E-89, which is phenolic condensate (by Orient Chemical Industries Co., Ltd.); TP-302 and TP-415, which are quaternary ammonium salt molybdenum complexes (by Hodogaya Chemical Co., Ltd.); LRA-901 and LR-147, which is boron complex, (by Japan Carlit Co., Ltd.); and copper phthalocyanine, perylene, quinacridone, azo-based dyes, and polymer compounds having a functional group, such as a sulfonate group, a carboxyl group, a quaternary ammonium salt.

The above-described agents may be used singly, or a combination of two or more agents may be used.

A content of the charge control agent is not particularly limited, and can be appropriately selected according to a purpose. The content of the charge control agent in the toner is preferably 0.1 wt % or more and 10 wt % or less, and more preferably 0.2 wt % or more and 5 wt % or less.

If the content of the charge control agent is 0.1 wt % or more and 10 wt % or less, it is possible to prevent the charging property of the toner from becoming too large, to maintain the effect of the main charge control agent, to prevent the electrostatic suction force with the developing roller from increasing, and to suppress a decrease in the fluidity of the developer or a decrease in an image density.

The above-described charge control agents can be melted and kneaded and dispersed together with the master batch and resin and then dissolved and dispersed, can be added when directly dissolved and dispersed in an organic solvent, and can be immobilized on the toner surface after the toner particles are fabricated.

[External Additive]

As external additives, inorganic particles or hydrophobized inorganic fine particles may be used simultaneously in addition to fine oxide particles.

Here, the hydrophobized inorganic fine particles are preferably inorganic fine particles having an average particle diameter of from 1 nm to 100 nm as primary particles, and more preferably are inorganic fine particles having an average particle diameter of from 5 nm to 70 nm. The average particle diameter refers to a volume average particle diameter measured using a laser diffraction/scattering type particle size distribution measuring device (LA-920 by HORIBA, Ltd.).

In addition, the external additives further preferably include at least one type of hydrophobized inorganic fine particles having an average particle diameter of 20 nm or less as primary particles and at least one type of inorganic fine particles having an average particle diameter of 30 nm or more.

The specific surface area of the external additives is preferably from 20 $m^2/g$ to 500 $m^2/g$. The specific surface area refers to a specific surface area measured by the nitrogen gas adsorption BET method using a specific surface area measurement device.

External additives are not particularly limited, and can be appropriately selected according to a purpose. Suitable external additives may include, for example, silica fine particles, hydrophobized silica, aliphatic acid metal salts (e.g., zinc stearate, and aluminum stearate), metal oxides (e.g., titania, alumina, tin oxide, and antimony oxide), and fluoropolymers. Suitable additives may include, for example, hydrophobized silica, titania, titanium oxide, and alumina fine particles.

Suitable silica fine particles may include, for example, R972, R974, RX200, RY200, R202, R805, and R812, all of which are manufactured by Nippon Aerosil Co., Ltd.

Suitable titania fine particles may include, for example, P-25 (manufactured by Nippon Aerosil Co., Ltd.), STT-30, STT-65C-S (manufactured by Titan Kogyo, Ltd.), TAF-140 (manufactured by Fuji Titanium Industry Co., Ltd.), MT-150W, MT-500B, MT-600B, and MT-150A (manufactured by Tayca Co., Ltd.).

Suitable hydrophobized treated fine titanium oxide particles may include, for example, T-805 (manufactured by Nippon Aerosil Co., Ltd.), STT-30A, STT-65S-S (manufactured by Titan Kogyo Ltd.), TAF-500T, TAF-1500T (manufactured by Fuji Titanium Industry Co., Ltd.), MT-100S, MT-100T (manufactured by Tayca Co., Ltd.), and IT-S (manufactured by Ishihara Sangyo Kaisha, Ltd.).

Hydrophobized oxide particles, hydrophobized silica particles, hydrophobized titania particles, and hydrophobized alumina particles may be obtained by treating hydrophilic fine particles with a silane coupling agent, such as methyltrimethoxysilane, methyltriethoxysilane, or octyltrimethoxysilane.

In addition, silicone oil-treated oxide fine particles and silicone oil-treated inorganic fine particles, obtained by treating inorganic fine particles with silicone oil, which is heated as necessary, are also preferable.

Suitable silicone oils may include, for example, dimethyl silicone oil, methyl phenyl silicone oil, chlorophenyl silicone oil, methyl hydrogen silicone oil, alkyl modified silicone oil, fluorine modified silicone oil, polyether modified silicone oil, alcohol modified silicone oil, amino modified silicone oil, epoxy modified silicone oil, epoxy polyether modified silicone oil, phenol modified silicone oil, carboxyl modified silicone oil, mercapto modified silicone oil, methacrylic modified silicone oil, and α-methylstyrene modified silicone oil.

Suitable inorganic fine particles may include, for example, silica, alumina, titanium dioxide, barium titanate, magnesium titanate, calcium titanate, strontium titanate, iron oxide, copper oxide, zinc oxide, tin oxide, silica sand, clay, mica, wollastonite, diatomaceous earth, chromium oxide, cerium oxide, read lead paint, antimony trioxide, magnesium oxide, zirconium oxide, barium sulfate, barium carbonate, calcium carbonate, silicon carbide, and silicon nitride. Among the above-described materials, silica and titanium dioxide are particularly preferable.

The above-described external additives may be used singly, or a combination of two or more external additives may be used.

A content of the external additives is not particularly limited, and can be appropriately selected according to a purpose. The content of the external additive in the toner is preferably 0.1 wt % or more and 5 wt % or less, and more preferably 0.3 wt or more and 3 wt or less.

An average particle diameter as a primary particle of the inorganic fine particles is not particularly limited, but is preferably 100 nm or less, and more preferably 3 nm or more and 70 nm or less. When the average particle diameter is 3 nm or more, inorganic fine particles can be prevented from being buried in toner, and from failing to effectively perform the function of the inorganic fine particles. In addition, when the average particle diameter is 100 nm or less, it is possible to prevent a surface of a photoreceptor from being damaged unevenly.

[Glass Transition Point]

The glass transition point (Tg) of the toner according to the present embodiment is normally 40° C. or more and 70° C. or less, and preferably 45° C. or more and 55° C. or less. When the temperature is 40° C. or more, the heat resistant preservability of the toner becomes excellent. When the temperature is 70° C. or less, the low temperature fixing property is sufficient. According to the coexistence of a crosslinking agent and/or an extended polyester resin, the toner according to the present embodiment exhibits excellent storage property even when the glass transition point is low compared to the conventional polyester-based toner.

[Viscosity]

A viscosity of toner is characterized by a temperature (Tη) at which the viscosity becomes 1,000 poises with a measurement frequency of 20 Hz. According to the present embodiment, the temperature Tη is normally 180° C. or less, and preferably 90° C. or more and 160° C. or less. When the temperature Tη exceeds 180° C., the low temperature fixing property degrades. That is, from the viewpoint of achieving both the low temperature fixing property and the hot offset resistance, the temperature TG' is preferably higher than the temperature Tη.

In other words, the difference between TG' and Tη (TG'−Tη) is preferably 0° C. or more, more preferably 10° C. or more, and even more preferably 20° C. or more. The upper limit of the difference is not particularly limited.

In addition, from the viewpoint of achieving both the heat resistant preservability and the low-temperature fixing property, the difference between Tη and Tg is preferably 0° C. or more and 100° C. or less. More preferably, the difference is 10° C. or more and 90° C. or less, and even more preferably, the difference is 20° C. or more and 80° C. or less. The acid value of the toner according to the present embodiment is more preferably 7 mg/g or more for preparing fine particles by a phase inversion emulsification method, and preferably 30 mg/g or more from the viewpoint of metal crosslinking with aggregated salt.

[Storage Elastic Modulus]

A storage elastic modulus is characterized by a temperature (TG') at which the storage elastic modulus becomes 10,000 dyne/$cm^2$ with a measurement frequency of 20 Hz. According to the present embodiment, the temperature TG' is normally 100° C. or more, and preferably 110° C. or more and 200° C. or less. When the storage elastic modulus is less than 100° C., the hot offset resistance deteriorates.

In the specification of the present application, the storage elastic modulus means a value (storage elastic modulus G') measured using a dynamic viscoelasticity measuring device (rheometer) (ARES, by TA Instruments, Inc.). The measurement of the storage elastic modulus by using the rheometer can be performed as follows.

First, the toner is molded into a pellet with a diameter of 8 mm and a thickness of 2 mm. Then, the toner is fixed to a parallel plate with a diameter of 8 mm and stabilized at 50° C. Furthermore, under the conditions of frequency of 10 Hz (6.28 rad/s), and a strain amount of 0.1% (strain amount control mode), a temperature rise rate is set to 2.0° C./min, and a toner pellet with 8 mm in diameter and 2 mm in thickness is fixed to a parallel plate having a diameter of 8 mm and stabilized at 50° C.

Next, under the conditions of the frequency of 10 Hz (6.28 rad/s) and the strain amount of 0.1% (strain amount control mode), the temperature is increased to 100° C. at a temperature rise rate of 2.0° C./min, and the storage elastic modulus G'(Pa) is measured with the strain amount of 1% and a cooling rate of 10° C./min.

The toner according to the present embodiment has a maximum value in a measurement curve of the storage elastic modulus G' in the dynamic viscoelasticity measurement in a range of 100° C. or more. Specifically, the toner according to the present embodiment has an inflection point with a temperature of 100° C. or more that appears at the highest temperature among inflection points where the measurement curve of the storage elastic modulus G' shifts from upper convexes to lower convexes, in the viscoelastic property for the temperature change obtained by the viscoelastic measuring device.

An example of the inflection point in the present embodiment is illustrated in FIG. 1. In FIG. 1, two inflection points of the measured curve of the storage elastic modulus G' are shown (inflection points are indicated by (1) and (2)).

The inflection point (1) will be described. The storage elastic modulus G' decreases from the measured temperature of about 40° C. and a rate of decrease slows down around 110° C. The point that shows the maximum rate of decrease (point where the slope of the tangent of the rate of decrease in the measurement curve becomes horizontal) in the range of decrease is the inflection point (1).

In addition, the inflection point (2) will be described. The storage elastic modulus G' increases from the measured temperature of about 120° C., and a rate of increase slows down around 150° C. The point that shows the maximum rate of increase (point where the slope of the tangent of the rate of increase in the measurement curve becomes horizontal) in the range of increase is the inflection point (2).

In the present embodiment, as shown in FIG. 1, if the storage elastic modulus G' has a maximum value (inflection point (2)) in the range of 100° C. or more, toner satisfying sufficient offset resistance and color reproducibility is obtained.

In addition, it is preferable that the toner according to the present embodiment has two extreme values in the measurement curve of the storage elastic modulus G' in the range of 100° C. or more. Specifically, as shown in FIG. 1, it has the inflection point (1) that is convex downward and the inflection point (2) that is convex upward within the range in which the measurement curve of the storage elastic modulus G' is 100° C. or more.

In the present embodiment, the offset resistance of the toner can be improved by having two extreme values (inflection point (1) and inflection point (2)) in the range where the measurement curve of the storage elastic modulus G' is 100° C. or more.

Further, in the toner according to the present embodiment, the storage elastic modulus G' is more preferably greater than or equal to $1.0\times10^3$ Pa in the range of 100° C. or more. Specifically, as shown in FIG. 1, the value of the storage elastic modulus G' in the range of 100° C. or more falls within the range from $1.0\times10^3$ Pa to $1.0\times10^5$ Pa.

In the present embodiment, since the storage elastic modulus G' is $1.0\times10^3$ Pa or more in the range of 100° C. or more, the offset resistance of the toner can be further improved.

It is further preferable that the toner according to the present embodiment have two extreme values in a range from 110° C. to 160° C. of the measurement curve of the storage elastic modulus G'. Specifically, as shown in FIG. 1, the inflection point (1) of the measurement curve of the storage elastic modulus G' appears in a range of from 110° C. to 140° C., and the inflection point (2) of the measurement curve of the storage elastic modulus G' appears in a range of from 140° C. to 160° C.

In the present embodiment, the color reproducibility can be improved by having two extreme values in the range of from 110° C. to 160° C. of the measurement curve of the storage elastic modulus G'.

The toner according to the present embodiment further preferably has a measurement temperature of 90° C. or more in the dynamic viscoelasticity measurement when the storage elastic modulus G' is $1.0\times10^4$ Pa. Specifically, as shown in FIG. 1, the temperature range, in which the storage elastic modulus G' satisfies $1.0\times10^4$ Pa, is 90° C. or more in the measurement curve of the storage elastic modulus G'.

In the present embodiment, when the storage elastic modulus G' is $1.0\times10^4$ Pa, the measured temperature in the dynamic viscoelastic measurement is 90° C. or higher, so that the color reproducibility can be further improved.

<Toner Storage Unit>

The toner storage unit according to the present embodiment stores the above-described toner. In the specification, a toner storage unit is a unit that has the function of storing toner and stores toner. Examples of the toner storage unit include a toner storage container, a developing device, a process cartridge, and the like.

The toner storage container is a container storing toner.

The developing device has means for storing and developing the toner.

Figure 5:
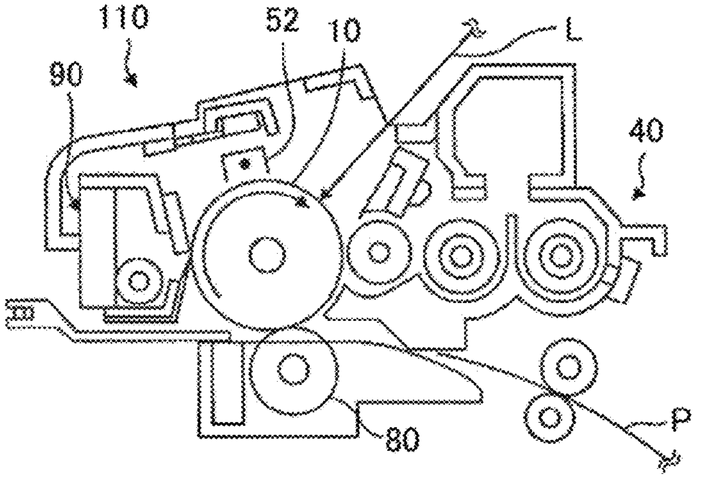
FIG. 5 is a diagram depicting an example of a process cartridge.

The process cartridge includes at least the image carrier and the developing device, which are integrated with each other, stores toner, and can be detachably mounted to and from the image forming apparatus. The process cartridge may further include at least one selected from a charging means, an exposure means, and a cleaning means. A specific example of a process cartridge forming a part of the toner storage unit according to the present embodiment is shown in FIG. 5, which will be described later.

In the toner storage unit according to the present embodiment, the above-described toner is used, and the effect obtained by the above-described toner is obtained as is. Specifically, since the toner storage unit according to the present embodiment is mounted to the image forming apparatus to form an image, an image is formed using the above-described toner, so that the offset resistance and the color reproducibility of the toner can be improved.

<Image Forming Apparatus>

An image forming apparatus according to the present embodiment includes a photoreceptor, a charging unit which charges the photoreceptor, an exposure unit which exposes the charged photoreceptor to form an electrostatic latent image, a developing device which develops the electrostatic latent image formed on the photoreceptor using the above-described toner to form a toner image, a transfer unit which transfers the toner image formed on the photoreceptor to a recording medium, and a fixing unit which fixes the toner image transferred to the recording medium.

Figure 2:
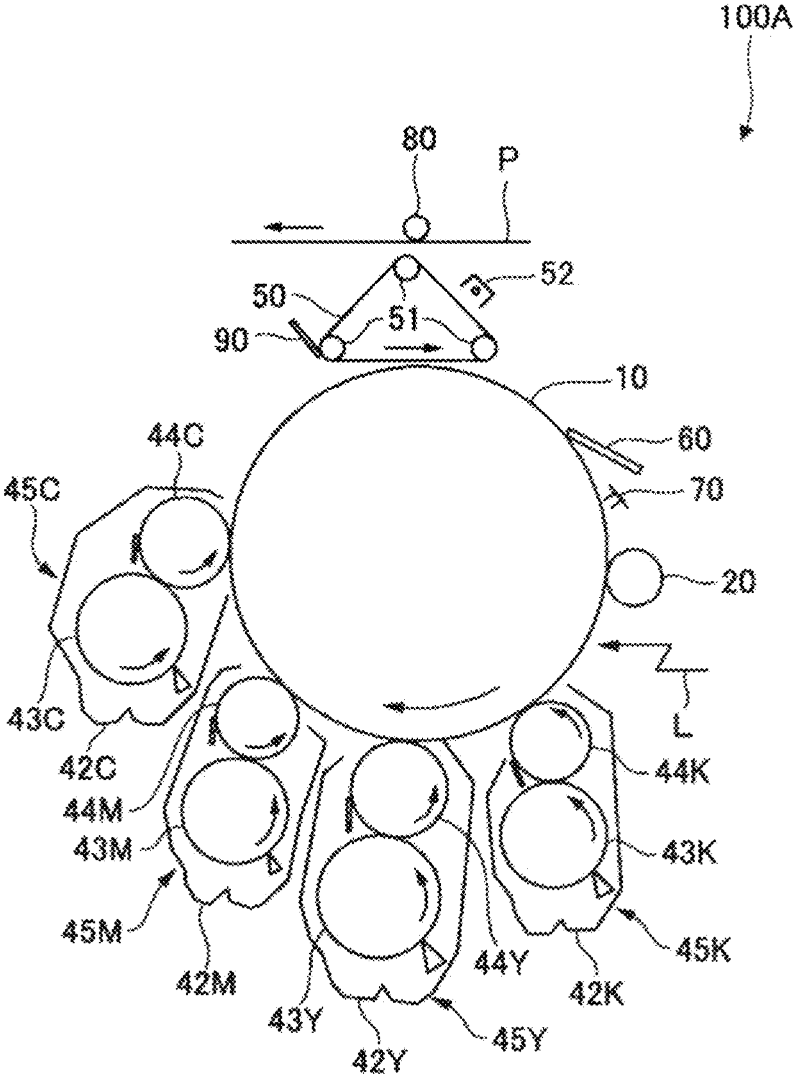
FIG. 2 is a diagram depicting an example of an image forming apparatus.

Specifically, the image forming apparatus according to the present embodiment can be configured by the example of the image forming apparatus according to the present embodiment shown in FIG. 2.

In FIG. 2, the image forming apparatus 100A includes a photoreceptor drum 10, a charging roller 20, an exposure device (not shown), a developing device 45 (K, Y, M, and C), an intermediate transfer belt 50, a cleaning device 60 having a cleaning blade, and a discharging lamp 70.

The intermediate transfer belt 50 is supported by three rollers 51 disposed on inside and can be moved in the direction of an arrow. A portion of the three rollers 51 also functions as a transfer bias roller capable of applying a predetermined transfer bias to the intermediate transfer belt 50.

A cleaning device 90 having a cleaning blade is disposed near the intermediate transfer belt 50. Further, a transfer roller 80 capable of applying a transfer bias for transferring a toner image to the recording sheet P is disposed facing the intermediate transfer belt 50.

Around the intermediate transfer belt 50, a corona charger 52 that applies a charge to the toner image on the intermediate transfer belt 50 is disposed between a contact portion of the photoreceptor drum 10 to the intermediate transfer belt 50 and a contact portion of the intermediate transfer belt 50 to the recording sheet P.

The developing devices 45 of black (K), yellow (Y), magenta (M), and cyan (C) include the developer storage sections 42 (K, Y, M, and C), the developer supply rollers 43 (K, Y, M, and C), and the developing rollers 44 (K, Y, M, and C), respectively.

In the image forming apparatus 100A, after the photoreceptor drum 10 is uniformly charged by the charging roller 20, the photoreceptor drum 10 is irradiated with exposure light L by the exposure device (not shown) to form an electrostatic latent image. Next, the electrostatic latent image formed on the photoreceptor drum 10 is developed by supplying a developer (including the above-described toner) from the developing device 45, and the toner image is transferred to the intermediate transfer belt 50 by the transfer bias applied from the roller 51.

The toner image on the intermediate transfer belt 50 is charged by the corona charger 52 and transferred onto the recording sheet P. The toner remaining on the photoreceptor drum 10 is removed by the cleaning device 60, and the photoreceptor drum 10 is discharged by the discharging lamp 70.

In the image forming apparatus 100A illustrated in FIG. 2, the photoreceptor drum 10, the charging roller 20, the exposure device, the developing device 45, the intermediate transfer belt 50, and the transfer roller 80 are examples of the photoreceptor, the charging unit, the exposure unit, the developing device, the transfer unit, and the fixing unit respectively of the image forming apparatus according to the present embodiment.

Figure 3:
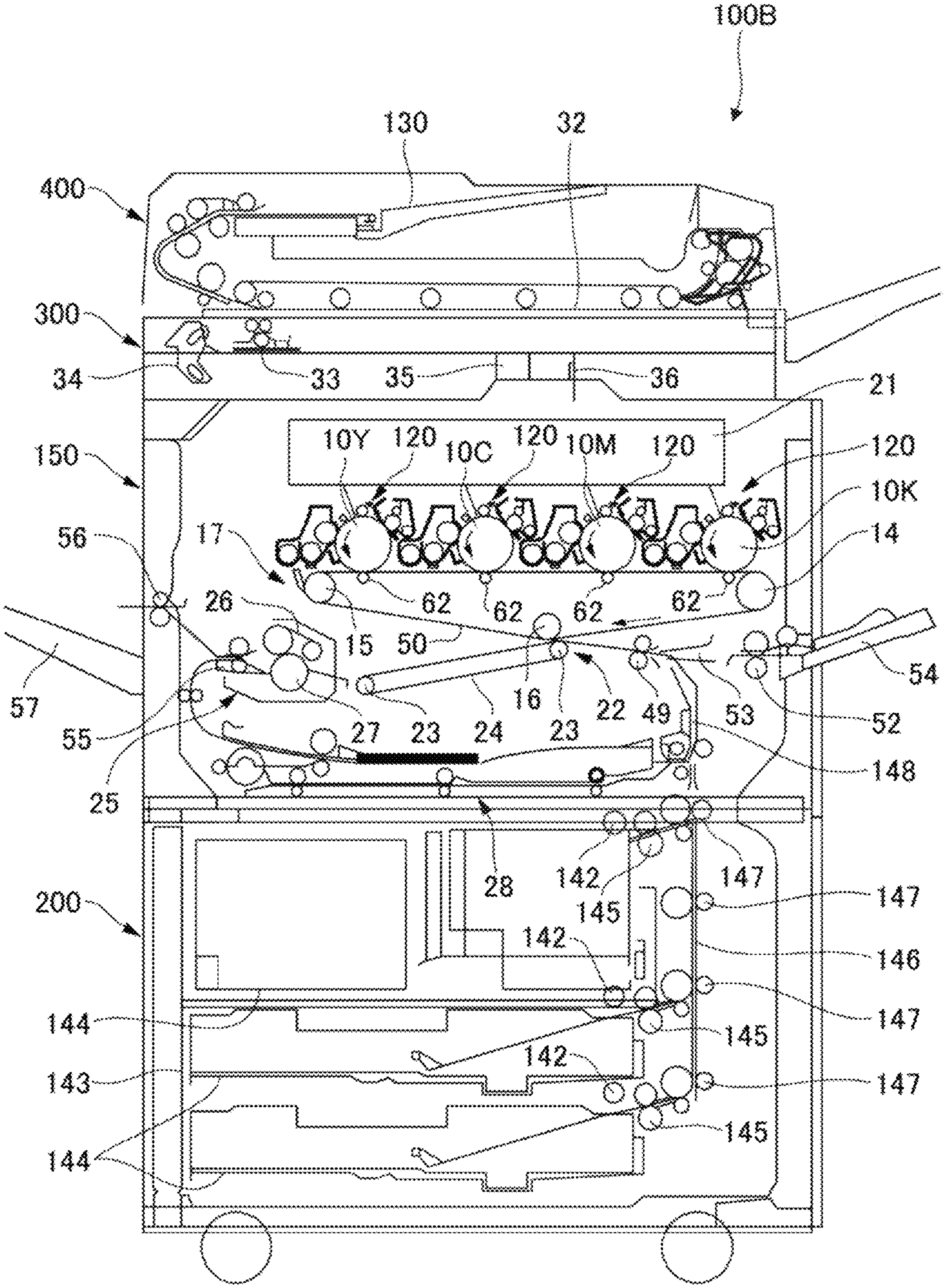
FIG. 3 is a diagram depicting another example of the image forming apparatus.

FIG. 3 shows another example of the image forming apparatus.

In FIG. 3, the image forming apparatus 100B is a tandem-type color image forming apparatus and includes a copying machine main body 150, a sheet feed table 200, a scanner 300, and an automatic document feeder (ADF) 400.

The intermediate transfer belt 50 is disposed in the central portion of the copying machine main body 150.

The intermediate transfer belt 50 is supported by rollers 14, 15, and 16 and can rotate in the arrow direction.

A cleaning device 17 for removing residual toner on the intermediate transfer belt 50 is disposed near the support roller 15. On the intermediate transfer belt 50 supported by the roller 14 and the roller 15, four image forming units 120 of black (K), yellow (Y), magenta (M), and cyan (C) are disposed to face the intermediate transfer belt 50 along the conveying direction.

Figure 4:
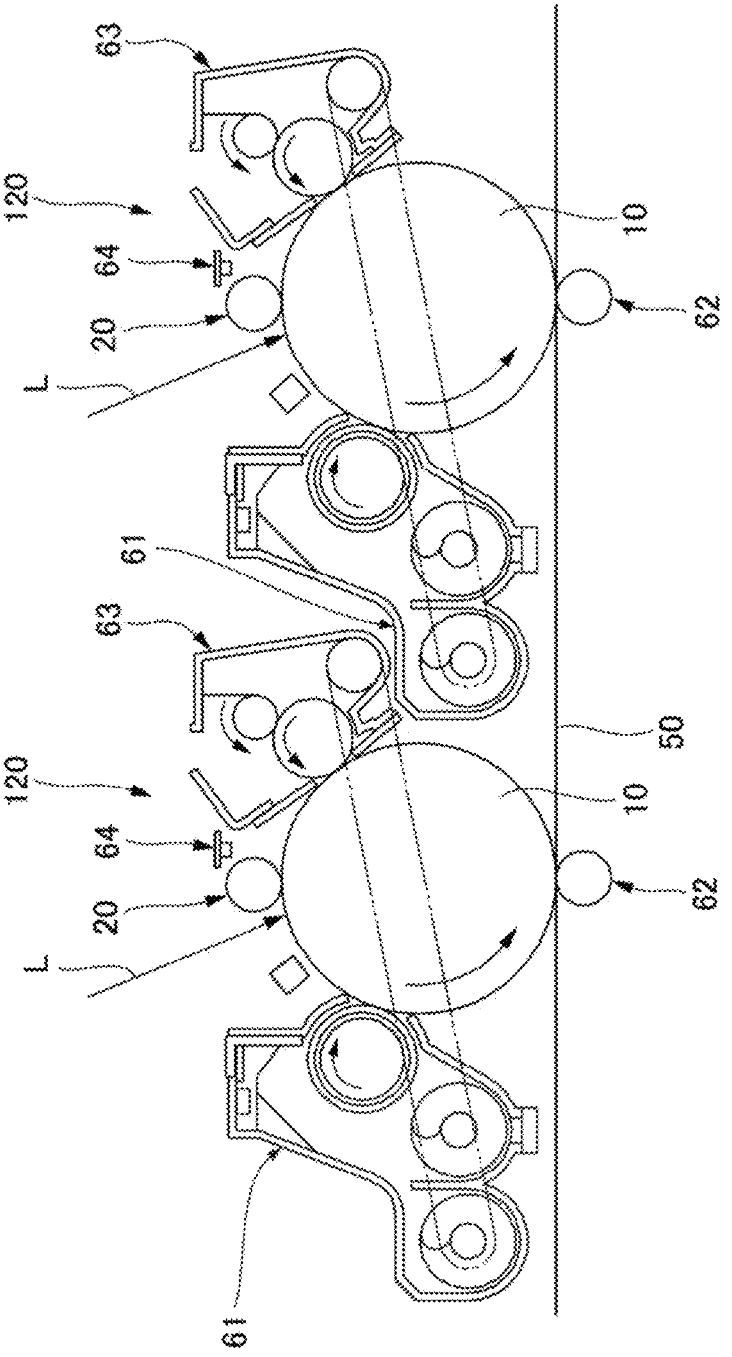
FIG. 4 is a partial enlarged view illustrating of the image forming apparatus shown in FIG. 3.

As shown in FIGS. 3 and 4, the image forming unit 120 of each color includes a photoreceptor drum 10, a charging roller 20 for uniformly charging the photoreceptor drum 10, a developing device 61 for forming a toner image, a transfer roller 62 for transferring the toner image of each color to the intermediate transfer belt 50, a cleaning device 63, and a discharging lamp 64.

In the developing device 61 of each of the image forming units 120, a toner image is formed by developing an electrostatic latent image formed on the photoreceptor drum 10 (K, Y, M, or C) with a developer (including the above-described toner) having colors of black (K), yellow (Y), magenta (M), or cyan (C).

Further, an exposure device 21 is disposed near the image forming unit 120. The photoreceptor drum 10 is irradiated with an exposure light L by the exposure device 21 to form an electrostatic latent image.

Further, a transfer device 22 is disposed on the side of the intermediate transfer belt 50 opposite to the side on which the image forming unit 120 is disposed. The transfer device 22 is a transfer belt 24 supported by a pair of rollers 23, so that the recording sheet P conveyed on the transfer belt 24 and the intermediate transfer belt 50 can come into contact with each other.

Returning to FIG. 3, a fixing device 25 is installed in the vicinity of the transfer device 22. The fixing device 25 includes a fixing belt 26 and a pressing roller 27 that is pressed against the fixing belt 26.

Further, a reversing device 28 is provided near the transfer device 22 and the fixing device 25 for reversing the recording sheet in order to form images on both sides of the recording sheet P.

Next, the formation of the full color image in the image forming apparatus 100B will be described. First, the document is set on a document table 130 of the automatic document feeder (ADF) 400, or the automatic document feeder 400 is opened to set the original document on a contact glass 32 of the scanner 300, and the automatic document feeder 400 is closed.

Next, when the start switch (not shown) is pressed, when the document is set in the automatic document feeder 400, after the document is conveyed and moved onto the contact glass 32, and when the document is set on the contact glass 32, the scanner 300 is immediately driven and the first traveling body 33 and the second traveling body 34 travel.

At this time, a document surface is irradiated with light emitted from a light source according to the operation of the first traveling body 33, light reflected from the document surface is reflected by a mirror in the second traveling body 34, and the light is received through the imaging lens 35 by a read sensor 36. Thus, the color document (the color image) is read, and image information of each of colors of black, yellow, magenta, and cyan is obtained.

Further, the exposure device 21 forms an electrostatic latent image of each color on the photoreceptor drum 10 based on the image information of each color. Then, the electrostatic latent image of each color is developed with a developer (including the above-described toner) supplied from the image forming unit 120 of each color, and a toner image of each color is formed. The toner images of the respective colors are sequentially transferred to the intermediate transfer belt 50 which rotates by the rollers 14, 15, and 16, and a composite toner image is formed overlayedly on the intermediate transfer belt 50.

In the sheet feed table 200, one of the sheet feed rollers 142 is selectively rotated, and the recording sheet is delivered from one of the sheet feed cassettes 144 provided in multiple stages in a paper bank 143. Each sheet of the delivered recording sheets is separated by a separation roller 145 and fed to a sheet feed passage 146, conveyed by a conveying roller 147, guided to a sheet feed passage 148 in the copying machine main body 150, and is made abut to a resist roller 49 to stop the sheet.

Alternatively, a recording sheet on the manual feed tray 54 is delivered, separated one by one by the separation roller 58, input to a manual feed passage 53, and is made abut to the resist roller 49 to stop the sheet. The resist roller 49 is generally ground to be used, but may be used while a bias is applied to remove paper powder from the recording sheet.

Then, the resist roller 49 rotates by timing to the composite toner image formed on the intermediate transfer belt 50, and feeds the recording sheet between the intermediate transfer belt 50 and the transfer device 22 so that the composite toner image is transferred onto the recording sheet.

The recording sheet on which the composite toner image is transferred is conveyed by the transfer device 22 and delivered to the fixing device 25. In the fixing device 25, the composite toner image is fixed on the recording sheet by pressed with heat by the fixing belt 26 and the pressing roller 27. Thereafter, the recording sheet is switched by a switching claw 55 and ejected by the ejection roller 56 and stacked on an ejection tray 57.

Alternatively, the recording sheet is switched over by the switching claw 55 and reversed by the reversing device 28 to be again guided to the transfer position, and another image is formed on the back surface of the recording sheet. The recording sheet is then ejected by the ejection roller 56 and stacked on the ejection tray 57.

The toner remaining on the intermediate transfer belt 50 after the composite toner image is transferred is removed by the cleaning device 17.

In the image forming apparatus 100B illustrated in FIG. 3, the photoreceptor drum 10, the charging roller 20, the exposure device 21, the image forming unit 120, the intermediate transfer belt 50, and the fixing device 25 are examples of the photoreceptor, the charging unit, the exposure unit, the developing device, the transfer unit, and the fixing unit respectively of the image forming apparatus according to the present embodiment.

FIG. 5 shows an example of a process cartridge as another example of the image forming apparatus.

The process cartridge 110 includes a photoreceptor drum 10, a corona charger 52, a developing device 40, a transfer roller 80, and a cleaning device 90.

In FIG. 5, in the process cartridge 110, the photoreceptor drum 10 uniformly charged by the corona charger 52 is irradiated with exposure light L by an exposure device (not shown), and an electrostatic latent image is formed on the photoreceptor drum 10. Next, the electrostatic latent image formed on the photoreceptor drum 10 is developed by the developer (including the above-described toner) supplied from the developing device 40, to form a toner image on the photoreceptor drum 10. The toner image is transferred by a transfer bias applied by the corona charger 52.

The toner image formed on the photoreceptor drum 10 is transferred to the recording sheet P by the transfer roller 80. The toner remaining on the photoreceptor drum 10 is removed by the cleaning device 90.

In the image forming apparatus 100B illustrated in FIG. 3, the photoreceptor drum 10, the corona charger 52, the exposure device, and the developing device 40 are examples respectively of the photoreceptor, the charging unit, the exposure unit, and the developing device of the image forming apparatus according to the present embodiment. The photoreceptor drum 10 is also an example of the transfer unit of the image forming apparatus according to the present embodiment. The transfer roller 80 is an example of the fixing unit of the image forming apparatus according to the present embodiment.

In the image forming apparatus according to the present embodiment, the above-described toner is used, and the effect obtained by the above-described toner is obtained as is. Specifically, in the image forming apparatus according to the present embodiment the image is formed using the above-described toner, and the offset resistance and the color reproducibility of the toner in the image forming can be improved.

<Image Forming Method>

An image forming method according to the present embodiment includes a charging step of charging a photoreceptor, an exposure step of exposing the charged photoreceptor to form an electrostatic latent image, a developing step of developing the electrostatic latent image formed on the photoreceptor using the above-described toner to form a toner image, a transfer step of transferring the toner image formed on the photoreceptor to a recording medium, and a fixing step of fixing the toner image transferred to the recording medium.

The image forming method according to the present embodiment is realized by implementing each example of the image forming apparatus shown in FIG. 2, 3, or 4.

Specifically, in each of the image forming apparatus 100A of FIG. 2 and the image forming apparatus 100B of FIG. 3, the charging step is performed by the photoreceptor drum 10 and the charging roller 20, and the photoreceptor is charged. In the process cartridge 110 of FIG. 5, the charging step is performed by the photoreceptor drum 10 and the corona charger 52, and the photoreceptor is charged.

In each of the image forming apparatus 100A in FIG. 2 and the exposure device in the process cartridge 110 in FIG. 5, the exposure step is performed by the exposure device and an electrostatic latent image is formed by exposing the charged photoreceptor. In the image forming apparatus 100B in FIG. 3, the exposure step is performed by the exposure device 21, the charged photoreceptor is exposed and an electrostatic latent image is formed.

In the image forming apparatus 100A in FIG. 2, the developing step is performed by the developing device 45, and the electrostatic latent image formed on the photoreceptor is developed using the toner described above, and a toner image is formed. Further, in the image forming apparatus 100B in FIG. 3, the developing step is performed by the image forming unit 120. In the process cartridge 110 in FIG. 5, the developing step is performed by the developing device 40, and the electrostatic latent image formed on the photoreceptor is developed using the toner described above, and a toner image is formed.

In each of the image forming apparatus 100A in FIG. 2 and the image forming apparatus 100B in FIG. 3, the transfer step is performed by the intermediate transfer belt 50, and the toner image formed on the photoreceptor is transferred to a recording medium. In the process cartridge 110 in FIG. 5, the transfer step is performed by the photoreceptor drum 10, and the toner image formed on the photoreceptor is transferred to a recording medium.

In each of the image forming apparatus 100A in FIG. 2 and the process cartridge 110 in FIG. 5, the fixing step is performed by the transfer rollers 80, and the transferred toner image is fixed to the recording medium. In the image forming apparatus 100B in FIG. 3, the fixing step is performed by the fixing device 25, and the transferred toner image is fixed to the recording medium.

In the image forming method according to the present embodiment, the above-described toner is used, and the effect obtained by the above-described toner is obtained as is. Specifically, in the image forming method according to the present embodiment the image is formed using the above-described toner, and the offset resistance and the color reproducibility of the toner in the image forming can be improved.

EXAMPLES

In the following, the embodiment of the present application will be described more specifically showing practical examples and comparative examples. However, the embodiment of the present application is not limited to the practical examples. In the following, "parts" and "%" are on a mass basis, unless otherwise noted.

[Preparation of Toner According to Example 1]

(Synthesis of Amorphous Polyester Resin 1)

Bisphenol A ethylene oxide two-molar adduct of 562 parts, bisphenol A propylene oxide two-molar adduct of 75 parts, bisphenol A propylene oxide three-molar adduct of 87 parts, terephthalic acid of 143 parts, adipic acid of 126 parts, and dibutyltin oxide of 2 parts were charged in a reaction vessel provided with a cooling pipe, an agitator, and a nitrogen introduction pipe. The charged raw material was reacted at normal pressure, and a temperature of 230° C., for 8 hours. The reaction was performed for 5 hours under the reduced pressure of 10 mmHg-15 mmHg. Trimellitic acid anhydride of 69 parts was added to the reaction vessel, and the reaction was performed at normal pressure, and at a temperature of 180° C., for 2 hours. According to the above-described reaction, amorphous polyester resin 1 was obtained. An acid value of the amorphous polyester resin 1 was 40 mgKOH/g.

(Preparation of Pigment Master Batch 1)

The amorphous polyester resin 1 and Pigment Red 269 were pre-mixed with one-to-one ratio using a Henschel mixer (FM20B by Mitsui Miike Chemical Engineering Machinery, Co., Ltd.) The mixture was melted and kneaded at 130° C. using a biaxial kneader (PCM-30 by Ikegai Corporation). The kneaded material was rolled to a thickness of 2.7 mm with a roller, then cooled to room temperature with a belt cooler, and roughly crushed to the size of from 200 μm to 300 μm with a hammer mill. According to the above-described reaction, pigment master batch 1 was obtained.

(Synthesis of Crystalline Polyester Resin 1)

A 1,6-hexane diol and sebacic acid were charged in 4 neck flask of 5 L provided with a nitrogen introduction pipe, a dewatering pipe, an agitator, and a thermocouple, so that a ratio of hydroxyl groups (OH) to carboxyl groups (COOH), OH/COOH, was 1.1. The charged raw material was reacted with titanium tetraisopropoxide of 500 ppm with respect to a mass of the charged raw material while making water flow out, finally heated to a temperature of 235° C., and reacted for 1 hour. Then, the reaction was performed for 6 hours under the reduced pressure of 10 mmHg or lower. The temperature was set to 185° C. Trimellitic acid anhydride was added so that a molar ratio to carboxyl groups (COOH) was 0.053, and the reaction was performed while stirring for 2 hours. According to the above-described reaction, a crystalline polyester resin 1 was obtained.

(Preparation of Crystalline Polyester Resin Dispersion Liquid 1)

The crystalline polyester resin 1 of 55 parts, methylethylketone of 35 parts, and 2-propyl alcohol of 10 parts were charged in 4 neck flask. The raw material was stirred while being heated at the melting point temperature of the crystalline polyester resin 1, and the crystalline polyester resin 1 was dissolved. Then, aqueous ammonia solution of 28 mass % was added so that degree of neutralization was 200%. The degree of neutralization was obtained by the acid value of the crystalline polyester resin 1. Furthermore, ion exchange water of 130 parts was gradually added, phase inversion emulsification was performed, and solvent was removed. Then, ion exchange water was added to adjust solid content concentration (a concentration of the crystalline polyester resin 1) to 25 mass %. Thus, the crystalline polyester resin dispersion liquid 1, which was toner binding resin dispersion, was obtained.

(Preparation of Wax Emulsion 1)

To ion exchange water of 100 parts, HNP-9 (manufactured by Nippon Seiro Co., Ltd.) of 28 parts as a wax and Sanizol B-50 were added as a surfactant. The mixture was dispersed in a homogenizer while heated to 90° C. to obtain wax emulsion 1. The solid component concentration was 30%.

(Preparation of Oil Phase)

Wax emulsion 1 of 50 parts, amorphous polyester resin 1 of 8,000 parts, crystalline polyester resin dispersion liquid 1 of 50 parts, and pigment master batch 1 of 50 parts were charged in a container and mixed using a TK homomixer (manufactured by Primix Corporation) at 5,000 rpm for 60 minutes to obtain oil phase 1. The above-described blending amount indicates an amount of solid contained in each raw material.

(Preparation of Water Phase)

Water of 990 parts, sodium dodecyl sulfate of 20 parts, and ethyl acetate of 90 parts were mixed and stirred, and thereby a milky-white liquid was obtained. The obtained liquid was set to water phase 1.

(Emulsification Process)

While stirring oil phase 1 of 700 parts at 8,000 rpm using the TK homomixer, 28% ammonia water of 20 parts was added to the oil phase 1, mixed for 10 minutes, and then the water phase 1 of 1,200 parts was dropped gradually, to obtain an emulsion slurry 1.

(Desolvation Process)

The emulsion slurry 1 was charged into a vessel provided with an agitator and a thermometer, and desolvation was performed for 180 minutes at 30° C., then desolvent slurry 1 was obtained.

(Aggregation Process)

After dropping a 3% aluminum chloride solution of 100 parts to the desolvent slurry 1, stirring for 5 minutes, the temperature was increased to 60° C., and sodium chloride of 50 parts were added when a particle size was 5.0 μm, to complete the aggregation step, and an aggregation slurry 1 was obtained.

(Fusing Process)

The aggregation slurry 1 was heated to 70° C. while stirring, and cooled when a mean circularity was 0.957, resulting in a dispersion slurry 1. The mean circularity was measured using a wet flow particle size/shape analyzer and analysis software (FPIA(trademark registered)-2100 Data Processing Program for FPIA version 00-10, by Sysmex Corporation).

(Annealing, Washing, and Drying Processes)

The toner dispersion liquid 1 was stored at 45° C. for 10 hours and then filtrated under reduced pressure. The toner dispersion liquid 1 was washed and dried as follows.

(1) ion exchange water of 100 parts was added to a filtered cake, and mixed using the TK homomixer (12,000 rpm for 10 minutes), and then filtrated.

(2) ion exchange water of 900 parts were added to the filtered cake of (1), mixed using the TK homomixer under ultrasonic vibration (at 12,000 rpm for 30 minutes), and subjected to vacuum filtration. This procedure was repeated so that the electrical conductivity of the slurry liquid was 10 μC/cm or less, and then filtrated to obtain the filtered cake 1.

The filtered cake 1 was dried at 45° C. for 72 hours by a circulating drier and sieved by a mesh with a mesh opening of 75 μm, to obtain colored resin particles 1.

(Externally Adding Process)

To colored resin particles 1 of 100 parts, inorganic fine particles (CAB-O-SOL TS-530 by Cabot Corporation) of 2.5 parts were added and mixed using a Henschel mixer at 40 m/s for 10 minutes, to obtain toner 1. The ratio of the presence of aluminum to the carboxyl group in the toner 1, calculated from the quantitative analysis value of ICP, was 33%.

[Preparation of Toner According to Example 2]

Toner 2 was obtained in the same manner as Example 1 except that the 3% aluminum chloride solution in the aggregation step was replaced with a 3% calcium chloride solution. The ratio of the presence of calcium to the carboxyl group in the toner 2 calculated from the quantitative analysis value of ICP was 30%.

[Preparation of Toner According to Example 3]

(Synthesis of Amorphous Polyester Resin 2)

Bisphenol A ethylene oxide two-molar adduct of 562 parts, bisphenol A propylene oxide two-molar adduct of 75 parts, bisphenol A propylene oxide three-molar adduct of 87 parts, terephthalic acid of 143 parts, adipic acid of 126 parts, and dibutyltin oxide of 2 parts were charged in a reaction vessel provided with a cooling pipe, an agitator, and a nitrogen introduction pipe. The charged raw material was reacted at normal pressure, and a temperature of 230° C., for 8 hours. The reaction was performed for 5 hours under the reduced pressure of 10 mmHg-15 mmHg. Trimellitic acid anhydride of 69 parts was added to the reaction vessel, and the reaction was performed at normal pressure, and at a temperature of 180° C., for 2 hours. According to the above-described reaction, amorphous polyester resin 2 was obtained. An acid value of the amorphous polyester resin 2 was 35 mgKOH/g.

(Preparation of Pigment Master Batch 2)

The amorphous polyester resin 2 and Pigment Red 269 were pre-mixed with one-to-one ratio using a Henschel mixer (FM20B by Mitsui Miike Chemical Engineering Machinery, Co., Ltd.) The mixture was melted and kneaded at 130° C. using a biaxial kneader (PCM-30 by Ikegai Corporation). The kneaded material was rolled to a thickness of 2.7 mm with a roller, then cooled to room temperature with a belt cooler, and roughly crushed to the size of from 200 μm to 300 μm with a hammer mill. According to the above-described reaction, pigment master batch 2 was obtained.

(Preparation of Oil Phase 2)

Wax emulsion 1 of 50 parts, polyester resin 1 of 8,000 parts, crystalline polyester resin dispersion liquid 1 of 50 parts, and pigment master batch 2 of 50 parts were charged in a container and mixed using the TK homomixer (manufactured by Primix Corporation) at 5,000 rpm for 60 minutes to obtain oil phase 2.

(Emulsification Process)

While stirring oil phase 2 of 700 parts at 8,000 rpm using the TK homomixer, 28% ammonia water of 20 parts was added to the oil phase 2, mixed for 10 minutes, and then the water phase 1 of 1,200 parts was dropped gradually, to obtain an emulsion slurry 2.

(Desolvation Process)

The emulsion slurry 2 was charged into a vessel provided with an agitator and a thermometer, and desolvation was performed for 180 minutes at 30° C., then desolvent slurry 2 was obtained.

(Aggregation Process)

After dropping a 3% magnesium chloride solution of 100 parts to the desolvent slurry 2, stirring for 5 minutes, the temperature was increased to 60° C., and sodium chloride of 50 parts were added when a particle size was 5.0 μm, to complete the aggregation step, and an aggregation slurry 3 was obtained.

(Fusing Process)

The aggregation slurry 3 was heated to 70° C. while stirring, and cooled when a mean circularity was 0.957, resulting in a dispersion slurry 3.

(Annealing, Washing, and Drying Processes)

The toner dispersion liquid 1 was stored at 45° C. for 10 hours and then filtrated under reduced pressure. The toner dispersion liquid 1 was washed and dried as follows.

(1) ion exchange water of 100 parts was added to a filtered cake, and mixed using the TK homomixer (12,000 rpm for 10 minutes), and then filtrated.

(2) ion exchange water of 900 parts were added to the filtered cake of (1), mixed using the TK homomixer under ultrasonic vibration (at 12,000 rpm for 30 minutes), and subjected to vacuum filtration. This procedure was repeated so that the electrical conductivity of the slurry liquid was 10 μC/cm or less, and then filtrated to obtain the filtered cake 3.

The filtered cake 3 was dried at 45° C. for 72 hours by a circulating drier and sieved by a mesh with a mesh opening of 75 μm, to obtain colored resin particles 3.

(Externally Adding Process)

To colored resin particles 3 of 100 parts, inorganic fine particles (CAB-O-SOL TS-530 by Cabot Corporation) of 2.5 parts were added and mixed using a Henschel mixer at 40 m/s for 10 minutes, to obtain toner 3. The ratio of the presence of magnesium to the carboxyl group in the toner 3, calculated from the quantitative analysis value of ICP, was 28%.

[Preparation of Toner According to Example 4]

(Synthesis of Amorphous Polyester Resin 3)

Bisphenol A ethylene oxide two-molar adduct of 362 parts, bisphenol A propylene oxide two-molar adduct of 75 parts, bisphenol A propylene oxide two-molar adduct of 83 parts, terephthalic acid of 143 parts, adipic acid of 126 parts, and dibutyltin oxide of 2 parts were charged in a reaction vessel provided with a cooling pipe, an agitator, and a nitrogen introduction pipe. The charged raw material was reacted at normal pressure, and a temperature of 230° C., for 8 hours. The reaction was performed for 5 hours under the reduced pressure of 10 mmHg-15 mmHg. Trimellitic acid anhydride of 69 parts was added to the reaction vessel, and the reaction was performed at normal pressure, and at a temperature of 180° C., for 2 hours. According to the above-described reaction, amorphous polyester resin 3 was obtained. An acid value of the amorphous polyester resin 3 was 30 mgKOH/g. Toner 4 was obtained in the same manner as Example 1 except that the amorphous polyester resin 1 was replaced with the amorphous polyester resin 3. The ratio of the presence of magnesium to the carboxyl group in the toner 4 calculated from the quantitative analysis value of ICP was 23%.

[Preparation of Toner According to Example 5]

Toner 5 was obtained in the same manner as Example 4 except that the amorphous polyester resin 1 was replaced with the amorphous polyester resin 3, and the magnesium chloride used in the aggregation step was changed to magnesium sulfate. The ratio of the presence of magnesium to the carboxyl group in the toner 5 calculated from the quantitative analysis value of the ICP was 20%.

[Preparation of Toner According to Comparative Example 1]

(Synthesis of Amorphous Polyester Resin 4)

Bisphenol A ethylene oxide two-molar adduct of 255 parts, bisphenol A propylene oxide two-molar adduct of 480 parts, terephthalic acid of 223 parts, adipic acid of 49 parts, and dibutyltin oxide of 2 parts were charged in a reaction vessel provided with a cooling pipe, an agitator, and a nitrogen introduction pipe. The charged raw material was reacted at normal pressure, and a temperature of 230° C., for 8 hours. The reaction was performed for 5 hours under the reduced pressure of 10 mmHg-15 mmHg. Trimellitic acid anhydride of 1 part was added to the reaction vessel, and the reaction was performed at normal pressure, and at a temperature of 180° C., for 2 hours. According to the above-described reaction, amorphous polyester resin 4 was obtained. An acid value of the amorphous polyester resin 4 was 10 mgKOH/g. Toner 6 was obtained in the same manner as Example 1 except that the amorphous polyester resin 1 was replaced with the amorphous polyester resin 4. The ratio of the presence of magnesium to the carboxyl group in the toner 6 calculated from the quantitative analysis value of ICP was 16%.

[Preparation of Toner According to Comparative Example 2]

(Preparation of Water Phase)

Water of 963 parts, a 48.3 aqueous solution of sodium dodecyl diphenyl ether disulfonate (Eleminol™ MON-7 manufactured by Sanyo Chemical Co., Ltd.) of 37 parts and ethyl acetate of 90 parts were mixed and stirred to obtain a milky white liquid. The obtained liquid was set to water phase 2.

(Synthesis of Amorphous Intermediate Polyester)

Bisphenol A ethylene oxide two-molar adduct of 200 parts, bisphenol A propylene oxide two-molar adduct of 563 parts, terephthalic acid of 283 parts, trimellitic acid anhydride of 22 parts, and dibutyltin oxide of 2 parts were charged in a reaction vessel provided with a cooling pipe, an agitator, and a nitrogen introduction pipe. The charged raw material was reacted at normal pressure, and a temperature of 230° C., for 7 hours. The reaction was performed for 5 hours under the reduced pressure of 10 mmHg-15 mmHg. According to the above-described reaction, amorphous intermediate polyester 1 was obtained. Then, the amorphous intermediate polyester 1 of 410 parts, isophorone diisocyanate of 89 parts, and ethyl acetate of 500 parts were charged in a reaction vessel provided with a cooling pipe, an agitator, and a nitrogen introduction pipe. The charged raw material was reacted at a temperature of 100° C. for 5 hours. According to the reaction, prepolymer 1 was obtained.

(Synthesis of Ketimine Compound)

Isophorone diamine of 170 parts and methyl ethyl ketone of 75 parts were charged in a reaction vessel provided with an agitator and a thermometer.

The charged raw material was reacted at a temperature of 45° C. for 5.5 hours. According to the reaction, a ketimine compound 1 was obtained.

(Synthesis of Crystalline Polyester Resin)

Stearic acid of 248 g, ethylene glycol of 27 g, and titanium dihydroxybis (triethanolaminate) of 0.5 g as a condensation catalyst were charged in a reaction vessel provided with a cooling pipe, a thermometer, an agitator, a dewatering device, and a nitrogen introduction pipe. The charged raw material was reacted in a nitrogen gas stream at a temperature of 180° C. for 2 hours while removing produced water. The reaction was performed for 3 hours under the reduced pressure of 5 mmHg-20 mmHg. According to the above-described reaction, crystalline polyester resin 1 was obtained.

(Preparation of Crystalline Resin Dispersant Resin)

Sebacic acid of 6.0 parts, ethylene glycol of 5.4 parts, fumaric acid of 3.4 parts, and xylene of 9.9 parts were charged in 4 neck flask of 5 L provided with a nitrogen introduction pipe, a dewatering pipe, an agitator, and a thermocouple. The charged raw material was reacted at a temperature of 180° C. for 10 hours. The reaction product was heated to 200° C. and reacted for 3 hours. Further, the reaction product was reacted under a pressure of 8.3 KPa for 2 hours. Then, a solution prepared by dissolving styrene of 38.3 parts, methacrylic acid of 0.3 parts, and di-t-butyl peroxide of 1.2 parts in xylene of 3.9 parts was added dropwise for 3 hours, and the solution was held at 170° C. for 30 minutes, and desolvation was performed. According to the above-described reaction, crystalline resin dispersant resin 1 was obtained.

(Preparation of Crystalline Polyester Resin Dispersion Liquid)

The crystalline polyester resin 1 of 446 parts, ethyl acetate of 1,894 parts, and the crystalline resin dispersant resin of 446 parts were charged into an agitatable pressure-resistant container. The charged raw material was stirred for 4 hours at 180 rpm by mechanical agitation. Then, carbon dioxide was flowed into the reaction product as a supercritical fluid at a temperature of 150° C., a pressure of 60 MPa, and a flow rate of 5.0 L/minute (standard state equivalent), so that a volume ratio of carbon dioxide is 85%, and a mixture of crystalline polyester resin and supercritical carbon dioxide was prepared. According to the above-described reaction, a crystalline polyester resin dispersion liquid 1 was obtained.

(Preparation of Oil Phase)

Paraffin wax (melting point: 90° C.) of 120 parts, the crystalline polyester resin dispersion liquid 1 of 446 parts, and ethyl acetate of 1,894 parts were charged into a container in which a stirred rod and a thermometer were set. The charged raw material was heated to 80° C. while stirred, and retained at 80° C. for 5 hours, and cooled to 30° C. for 1 hour. Then, 250 parts of cyan pigment (C.I. Pigment blue 15:3) and ethyl acetate of 1,000 parts were charged into the container and mixed for 1 hour, to obtain a raw material dissolving liquid 1. The raw material dissolving liquid 1 of 1,324 parts was transferred to another container, and dispersion was performed using a bead mill (Ultra Viscomill, by AIMEX Co., Ltd.), with a liquid sending speed of 1 kg/h, and peripheral speed of disk of 6 m/s, zirconia beads having diameters of 0.5 mm were filled to 80 volume %, under condition of 5 paths, and thereby a pigment-wax dispersion liquid 1 was obtained.

(Emulsification and Desolvation)

The pigment-wax dispersion liquid 1 of 375 parts, the prepolymer 1 of 500 parts, the ketimine compound 1 of 15 parts were charged in a container, and mixed using a TK homomixer (manufactured by Tokushu Kika Kogyo Co., Ltd.) at 5,000 rpm for 5 minutes. Then, the water phase 1 of 1,200 parts were added to the container, and the mixture was mixed using the TK homomixer at 10,000 rpm for 1.5 hours, to obtain an emulsion slurry 1. The emulsion slurry 1 was charged into a vessel equipped with an agitator and a thermometer, subjected to desolvation at 30° C. for 8 hours, and the mixture was aged at 40° C. for 72 hours, to obtain a dispersion slurry 1.

(Washing and Drying)

The dispersion slurry 1 of 100 parts was subjected to vacuum filtration, and the following series of washing were performed. That is, adding ion exchange water of 100 parts to the obtained filtered cake, mixing them using the TK homomixer (with rotation speed of 12,000 rpm for 10 minutes), and filtrating them; Adding hydrochloric acid of 10% of 100 parts to the obtained filtered cake, mixing them using the TK homomixer (with rotation speed of 12,000 rpm for 10 minutes), and filtering then; Adding ion exchange water of 300 parts to the obtained filtered cake, mixing them using the TK homomixer (with rotation speed of 12,000 rpm for 10 minutes), and filtering them twice, to obtain a filtered cake 1. The filtered cake 1 was dried at a temperature of 45° C. for 48 hours by a circulating drier, sieved by a mesh with a mesh opening of 75 μm, and thereby toner base particles 1 were obtained. Next, large particle diameter silica (HSP160A by FUSO Chemical Co., Ltd., and RX40 by Nippon Aerosil Co., Ltd.) of 2.20 wt s was added to the toner base particles 1, obtained as above, and the mixture was mixed using a Henschel mixer. Further, hydrophobic silica having small particle diameter (R972, by Nippon Aerosil Co., Ltd) of 0.6 wt % was added and the mixture was mixed using the Henschel mixer, and coarse large particles were removed using a screen with a mesh aperture of 37 μm, to prepare a toner 7. The ratio of the presence of metal salt to the carboxyl group in the toner 7 calculated from the quantitative analysis value of ICP was 0%.

[Evaluation]

(High Temperature Fixing Property (High Temperature Offset Property)

A fixing unit of a color multifunction peripheral (imagio MP C4500 by Ricoh Co., Ltd.) was used to form a black unfixed solid image of 0.6 mg/cm$^2$ on a sheet of plain paper, and the image was fixed while changing the fixing temperature. The temperature, at which a hot offset occurred, was measured and evaluated on a three level scale.

Excellent: 190° C. or more
Good: 170° C. or more and less than 190° C.
Poor: below 170° C.

(Color Reproducibility)

Color reproducibility was evaluated by measuring saturation C* using a colorimeter (939 portable spectral calorimeter, by X-Rite Inc.) with D50 light source and the angle of visibility is set at 2°.

Excellent: 78 to 81
Good: 75 to 78
Poor: less than 75

TABLE 1 shows the respective physical properties of the toners of Examples and Comparative Examples measured according to the method described above.

TABLE 1

| | Aggregated sail | Acid value of amorphous polyester resin | Ratio of presence of metal salt to carboxyl group in toner | Number of maximum values of G' in range higher than 100° C. | Minimum value of G' in range higher than 100° C. | Number of maximum values of G' in range of 110° C. to 160° C. | Temperature at G' = 1.0 × 10$^4$Pa | High temperature offset property | Color reproducibility |
|---|---|---|---|---|---|---|---|---|---|
| Ex. 1 | $AlCl_3$ | 40 mg/g | 33% | 2 | 5.2 × 10$^4$ | 2 | 120 | Excellent | Excellent |
| Ex. 2 | $CaCl_2$ | 40 mg/g | 30% | 2 | 4.5 × 10$^4$ | 2 | 80 | Excellent | Excellent |
| Ex. 3 | $MgCl_2$ | 35 mg/g | 28% | 2 | 4.2 × 10$^4$ | 1 | 78 | Excellent | Excellent |
| Ex. 4 | $MgCl_2$ | 30 mg/g | 23% | 2 | 3.9 × 10$^4$ | 1 | 70 | Excellent | Excellent |
| Ex. 5 | $MgSO_4$ | 30 mg/g | 20% | 2 | 3.5 × 10$^4$ | 0 | 65 | Good | Good |

TABLE 1-continued

| | Aggregated sail | Acid value of amorphous polyester resin | Ratio of presence of metal salt to carboxyl group in toner | Number of maximum values of G' in range higher than 100° C. | Minimum value of G' in range higher than 100° C. | Number of maximum values of G' in range of 110° C. to 160° C. | Temperature at G' = $1.0 \times 10^4$Pa | High temperature offset property | Color reproducibility |
|---|---|---|---|---|---|---|---|---|---|
| Comp. Ex. 1 | $MgCl_2$ | 10 mg/g | 16% | 0 | $3.1 \times 10^4$ | 0 | 63 | Poor | Good |
| Comp. Ex. 2 | none | 40 mg/g | 0% | 0 | $2.5 \times 10^4$ | 0 | 58 | Poor | Poor |

From results shown in TABLE 1, both the high temperature fixing property and the color reproducibility in each of Examples 1 to 5 are found to be "Excellent" or "Good".

In contrast, the high temperature fixing property of each of Comparative Examples 1 and 2 is found to be "Poor". Furthermore, the color reproducibility in Comparative Example 2 is also found to be "Poor".

From the above-described results, it is found that a toner containing a binding resin and a metal crosslinking agent forming a metal crosslinking with the binding resin, and having a measurement curve of a storage elastic modulus G' in a dynamic viscoelasticity measurement having a maximum value within a range of 100° C. or more, has excellent offset resistance and color reproducibility.

Specific embodiments of the invention have been described above, however, it should be understood that the above-described embodiments are provided only as examples, that the present invention is not limited to the particulars of the described embodiments. The above-described embodiments can be implemented in other various modes, and various variations, modifications, replacements, additions, deletions, and combinations may be made without departing from the scope of the present disclosure. The embodiments and their variations belong to the scope of the present invention and abstract, and also belong to the invention recited in claims and equivalents thereof.

What is claimed is:

1. A toner comprising:

a binding resin; and a metal crosslinking agent that forms a metal crosslinking with the binding resin, wherein a highest temperature among inflection points where a measurement curve of a storage elastic modulus G' of the toner shifts from upper convexes to lower convexes is 100° C. or higher.

2. The toner according to claim 1, wherein the measurement curve of the storage elastic modulus G' of the toner has two extreme values in the range of 100° C. or more.

3. The toner according to claim 1, wherein the storage elastic modulus G' of the toner is greater than or equal to $1.0 \times 10^3$ Pa in the range of 100° C. or more.

4. The toner according to claim 1, wherein the measurement curve of the storage elastic modulus G' of the toner has two extreme values within a range of from 110° C. to 160° C. inclusive.

5. The toner according to claim 1, wherein a measured temperature in the dynamic viscoelasticity measurement is 90° C. or more when the storage elastic modulus G' of the toner is $1.0 \times 10^4$ Pa.

6. The toner according to claim 1, wherein the metal crosslinking agent includes a metal salt having a valence of one or more.

7. A toner storage unit storing the toner according to claim 1.

8. An image forming apparatus comprising:

a photoreceptor;

a charging unit that charges the photoreceptor;

an exposure unit that exposes the charged photoreceptor to form an electrostatic latent image;

a developing device that develops the electrostatic latent image formed on the photoreceptor using the toner according to claim 1 to form a toner image;

a transfer unit that transfers the toner image formed on the photoreceptor to a recording medium; and a fixing unit that fixes the toner image transferred to the recording medium.

9. A method of forming an image comprising:

charging a photoreceptor;

exposing the charged photoreceptor to form an electrostatic latent image;

developing the electrostatic latent image formed on the photoreceptor using the toner according to claim 1 to form a toner image;

transferring the toner image formed on the photoreceptor to a recording medium; and fixing the toner image transferred to the recording medium.

10. The toner according to claim 1, wherein the binder resin comprises a crystalline polyester resin.

11. The toner according to claim 10, wherein the content of crystalline polyester resin in the toner is greater than or equal to 3 wt. % and less than or equal to 20 wt. %.

12. The toner according to claim 1, wherein the metal crosslinking agent comprises magnesium chloride, calcium chloride, aluminum chloride, or magnesium sulfate.

13. The toner according to claim 12, wherein the binder comprises an amorphous polyester resin.

14. The toner according to claim 13, wherein the binder resin further comprises a crystalline polyester resin.

15. The toner according to claim 12, wherein the binder resin contains a crystalline polyester resin.

16. The toner according to claim 1, wherein the binding resin comprises an amorphous polyester resin.

17. The toner according to claim 16, wherein the binder resin further comprises a crystalline polyester resin.

18. The toner according to claim 16, wherein the content of amorphous polyester resin in the toner is from 50 wt. % to 90 wt. %.

19. The toner according to claim 16, wherein the amorphous polyester resin has an acid value of 30 to 40 mg/g.

20. The toner according to claim 1, wherein the binding resin comprises a crystalline resin and an amorphous resin.

* * * * *